United States Patent
Okita et al.

(10) Patent No.: US 6,645,067 B1
(45) Date of Patent: *Nov. 11, 2003

(54) MUSIC STAGING DEVICE APPARATUS, MUSIC STAGING GAME METHOD, AND READABLE STORAGE MEDIUM

(75) Inventors: Katsunori Okita, Kobe (JP); Tadasu Kitae, Nishinomiya (JP); Masato Nagatomi, Nishinomiya (JP); Naonobu Kaneiso, Kobe (JP); Toru Takeda, Osaka (JP)

(73) Assignee: Konami Co., Ltd., Tokyo-to (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/501,837

(22) Filed: Feb. 10, 2000

(30) Foreign Application Priority Data

Feb. 16, 1999 (JP) ............................. 11-037936

(51) Int. Cl.$^7$ ..................... A63F 13/00; A63F 9/24; G06F 17/00; G06F 19/00
(52) U.S. Cl. ................. 463/7; 463/1; 463/23; 463/35; 463/36; 463/37; 463/43; 434/307 A
(58) Field of Search ............................. 463/7, 1, 2, 3, 463/23, 35, 36, 37, 38, 43, 46, 47; 84/477 R, 743, 600; 434/307 A, 4, 10, 308, 309, 314, 315, 316, 319, 320

(56) References Cited

U.S. PATENT DOCUMENTS

| 1,473,495 A | 1/1923 | Miller |
| 4,694,723 A | 9/1987 | Shinohara et al. |

(List continued on next page.)

FOREIGN PATENT DOCUMENTS

| DE | 29 703 145 | 6/1997 |
| EP | 0823270 | 2/1998 |
| JP | 48-93298 | 12/1973 |
| JP | 50-77031 | 6/1975 |
| JP | 59-030169 | 2/1984 |
| JP | 59-144983 | 9/1984 |
| JP | 59-144984 | 9/1984 |
| JP | 59-169177 | 11/1984 |
| JP | 60-55177 | 4/1985 |
| JP | 60-83097 | 5/1985 |
| JP | 60-87397 | 5/1985 |

(List continued on next page.)

OTHER PUBLICATIONS

Hasebe Sei, JP 08–305356, Yamaha Corp., Publication date: Nov. 22, 1996 (translation) (18 pages).*

(List continued on next page.)

Primary Examiner—S. Thomas Hughes
Assistant Examiner—Binh-An D. Nguyen
(74) Attorney, Agent, or Firm—Jordan and Hamburg LLP

(57) ABSTRACT

A CPU controls a graphic controller based on control programs within a main RAM to extract a series of rhythm sound data for each of multiple mimic percussion instruments from a graphic RAM and correlates these in a time-axial direction for display on a monitor, instruction and display of the operating timing for each sound of the multiple mimic percussion instruments is performed on the monitor, the player performs sequential striking input with the left and right hands, for example, for the rhythm sounds via a rhythm input detecting apparatus corresponding to multiple mimic percussion instruments, while following the operation timing display instructions thereof. The timing thereof is compared with the timing of the display instruction and evaluation is made based on the offset thereof, and the evaluation results are accumulated. Thus, a rhythm-matching game with a high gaming nature is realized, by inputting operation for multiple instruments using multiple hands and feet such as the left and right hands.

27 Claims, 15 Drawing Sheets

U.S. PATENT DOCUMENTS

| | | | | |
|---|---|---|---|---|
| 4,695,903 | A | * | 9/1987 | Serap et al. .................. 360/55 |
| 4,781,097 | A | * | 11/1988 | Uchiyama et al. ............ 84/738 |
| 4,791,848 | A | * | 12/1988 | Blum, Jr. ..................... 84/453 |
| 5,140,889 | A | * | 8/1992 | Segan et al. ................ 446/408 |
| 5,183,398 | A | * | 2/1993 | Monte et al. ............... 434/227 |
| 5,206,842 | A | * | 4/1993 | Spector ......................... 369/4 |
| 5,214,231 | A | * | 5/1993 | Ernst et al. ................... 84/478 |
| 5,218,580 | A | * | 6/1993 | Okamura et al. ............. 369/2 |
| 5,223,658 | A | * | 6/1993 | Suzuki ........................ 84/615 |
| 5,231,239 | A | | 7/1993 | Tsumura et al. |
| 5,233,521 | A | | 8/1993 | Kimpara |
| 5,286,909 | A | * | 2/1994 | Shibukawa .................. 84/478 |
| 5,355,762 | A | | 10/1994 | Tabata |
| 5,393,926 | A | | 2/1995 | Johnson |
| 5,394,784 | A | * | 3/1995 | Pierce et al. .............. 84/464 A |
| 5,408,914 | A | * | 4/1995 | Breitweiser et al. .......... 84/455 |
| 5,464,946 | A | * | 11/1995 | Lewis ...................... 84/477 R |
| 5,484,291 | A | * | 1/1996 | Nakai et al. ................ 386/102 |
| 5,491,297 | A | | 2/1996 | Johnson et al. |
| 5,512,704 | A | | 4/1996 | Adachi |
| 5,513,129 | A | | 4/1996 | Bolas et al. |
| 5,544,562 | A | | 8/1996 | Jeon |
| 5,574,238 | A | | 11/1996 | Mencher |
| 5,592,609 | A | | 1/1997 | Suzuki et al. |
| 5,649,861 | A | | 7/1997 | Okano et al. |
| 5,680,533 | A | | 10/1997 | Yamato et al. |
| 5,680,534 | A | | 10/1997 | Yamato et al. |
| 5,714,703 | A | | 2/1998 | Wachi et al. |
| 5,739,457 | A | | 4/1998 | Devecka |
| 5,746,656 | A | | 5/1998 | Bewick et al. |
| 5,824,933 | A | | 10/1998 | Gabriel |
| 5,886,273 | A | | 3/1999 | Haruyama |
| 5,925,843 | A | | 7/1999 | Miller et al. |
| 6,001,013 | A | | 12/1999 | Ota |
| 6,005,180 | A | | 12/1999 | Masuda |
| 6,018,121 | A | * | 1/2000 | Devecka ................. 434/307 A |
| 6,072,113 | A | * | 6/2000 | Tohgi et al. ............... 84/470 R |
| 6,075,197 | A | * | 6/2000 | Chan .......................... 84/730 |
| 6,379,244 | B1 | * | 4/2002 | Sagawa et al. ......... 434/307 A |
| 6,390,923 | B1 | * | 5/2002 | Yoshitomi et al. ...... 434/307 R |
| 6,410,835 | B2 | | 6/2002 | Suzuki et al. |
| 6,461,239 | B1 | | 10/2002 | Sagawa et al. |

FOREIGN PATENT DOCUMENTS

| | | |
|---|---|---|
| JP | 60-260093 | 12/1985 |
| JP | 61-99200 | 6/1986 |
| JP | 62-2600 | 2/1987 |
| JP | 63-52377 | 3/1988 |
| JP | 2-100300 | 8/1990 |
| JP | 3-84599 | 4/1991 |
| JP | 3-198890 | 8/1991 |
| JP | 3-198891 | 8/1991 |
| JP | 4-093982 | 3/1992 |
| JP | 5-80693 | 4/1993 |
| JP | 5-158480 | 6/1993 |
| JP | 5-158481 | 6/1993 |
| JP | 5-216476 | 8/1993 |
| JP | 5-66662 | 9/1993 |
| JP | 6-84421 | 3/1994 |
| JP | 6-62431 | 9/1994 |
| JP | 6-282287 | 10/1994 |
| JP | 6-295193 | 10/1994 |
| JP | 7-204353 | 8/1995 |
| JP | 8-23597 | 1/1996 |
| JP | 8-54884 | 2/1996 |
| JP | 8-166780 | 6/1996 |
| JP | 8-305356 | 11/1996 |
| JP | 8-323044 | 12/1996 |
| JP | 9-160546 | 6/1997 |
| JP | 9-160574 | 6/1997 |
| JP | 9-212107 | 8/1997 |
| JP | 9-305171 | 11/1997 |
| JP | 10-118336 | 5/1998 |
| TW | 356429 | 4/1999 |

OTHER PUBLICATIONS

* (1) Compact disc product entitled "PaRappaTheRapper" c 1996 Sony Computer Entertainment Inc.
* (2) Compact disc product entitled "Quest For Fame" c 1993, 1994, 1995, 1996, 1997 Virtual Music Entertainment, Inc. (Sony Computer Entertainment).
* (3) Compact disc product entitled "Digital Dance Mix" c Sega Enterprises, Ltd. 1997.
* (4) Document relating to items (1)–(3) dated Sep. 7, 1999.
(5) Statement submitted by Japanese Patent Office by the plaintiff of the invalidation trial against the original Japanese application on which the priority of US application is based. (4 sheets of written statement of 7 reference evidences in Japanese). English translation of the statement.
(6) Copy of purchase slip of Yamaha CLAVINOVA CVP–96.
(7) Sankei Shimbun article dated Jul. 17, 1997.
(8) MONO Magazine No. 355 (published Dec. 16, 1997).
(9) Instruction manual, main course, of Yamaha CLAVINOVA CVP–98/CVP–96.
(10) Instruction manual, main course, of Yamaha CLAVINOVA CVP–98/CVP–96.
(11) Yamaha News Release, dated Jul. 1997, in Japanese with English Abstract.
Notice of opposition filed by SEGA ENTERPRISES, LTD. (31 pages).
Game screen of home game "Mr. BONES" (4 pages).
Report for the screen movement of "Mr. BONES" (2 pages).
Front page of game magazine "Sega Satan Magazine" vol. 23–1997 published by SOFTBANK on Jul. 11, 1997.
Back page of game magazine "Sega Satan Magazine" vol. 23–1997 published by SOFTBANK on Jul. 11, 1997.
Order slip of CD ROM for "Mr. BONES" to Victor Media Products issued by SEGA ENTERPRISES, LTD.).
Sales of CD ROM for "Mr. BONES" to SEGA UNITED issued by SEGA ENTERPRISES., LTD.) (1 page).
Front label of CD ROM for "Mr. BONES".
Back label of CD ROM for "Mr. BONES".
Back label of videotape having the actual screen image for "Mr. BONES" (1 page).
Side label of videotape having the actual screen image for "Mr. BONES" (1 page).
Contents (including p178–181) of game magazine "Sega Satan Magazine" vol. 23–1997 published by SOFTBANK on Jul. 11, 1997 (3 pages).
Front page of game magazine "Sega Satan Magazine" vol. 14–1997 published by SOFTBANK on May 2, 1997 (1 page).
Back page of game magazine "Sega Satan Magazine" vol. 14–1997 published by SOFTBANK on May 2, 1997 (1 page).
Contents (including p104–105) of game magazine "Sega Satan Magazine" vol. 14–1997 published by SOFTBANK on May 2, 1997 (1 page).

* cited by examiner

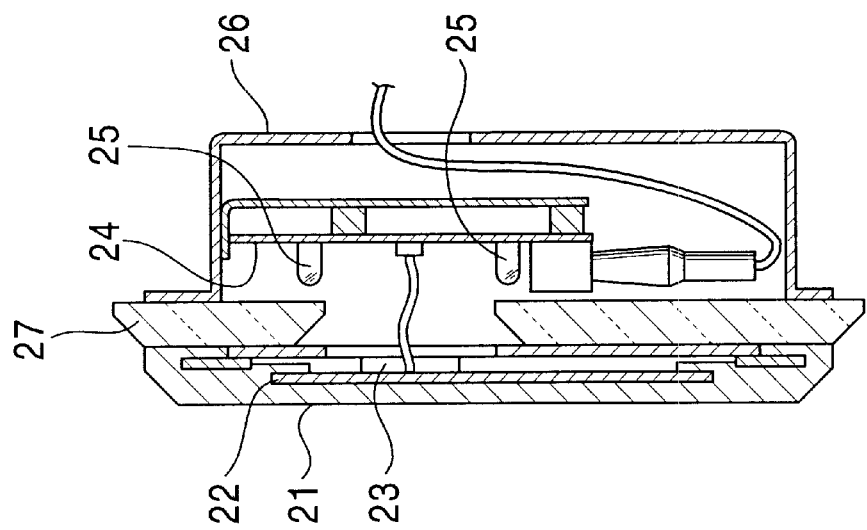
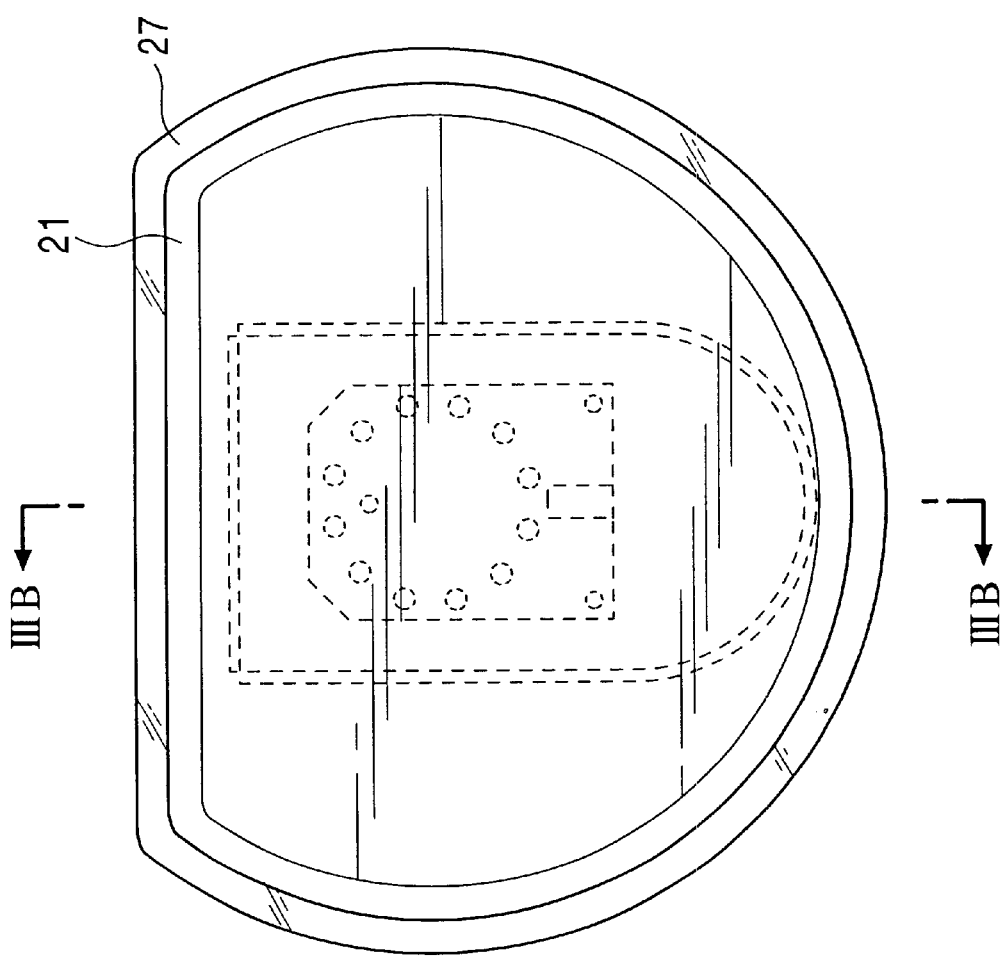

THIS GAME IS FOR SALE AND USE IN
JAPAN ONLY. THE COPYRIGHTED MUSIC/
CHARACTERS/ART WORK IN THIS GAME
ARE SEPARATELY OWNED BY THE AUTHORS.
THE PUBLIC PERFORMANCE OF THIS GAME
OUTSIDE THIS TERRITORY IS PROHIBITED
BY LAW AND VIOLATORS ARE SUBJECT TO
SEVERE PENALTIES UNLESS SPECIALLY
AUTHORIZED BY KONAMI.

©1999 KONAMI
ALL RIGHTS RESERVED.

58

MUSIC STAGING DEVICE APPARATUS, MUSIC STAGING GAME METHOD, AND READABLE STORAGE MEDIUM

FIELD OF THE INVENTION

The present invention relates to a music staging game apparatus such as a rhythm game apparatus for performing a musical rhythm-matching game and a music staging game method, and a readable storage medium wherein a music staging game program thereof is stored.

DESCRIPTION OF THE RELATED ART

Conventionally, there are game systems wherein sounds are matched in rhythm with background music (Back Ground Music), or wherein a short playing around one phrase or so is added and played.

Also, guitar game apparatus which generates a cardiogram-like rhythm, which performs rhythm matching while watching a cardiogram-like rhythm, has been proposed (refer to Japanese Patent National Publication No. 8-510849).

However, with rhythm-matching such as the above-described conventional guitar game apparatus, operation was performed to one instrument, but this was not a rhythm-matching game performed in a state closer to reality where a player uses the a plurality of the right hand and left hand and further the right foot and left foot, such as the right and left hands for example, for multiple percussion instruments, as with an actual instrument, and thus did not have a high game-nature.

SUMMARY OF THE INVENTION

The present invention has been made in order to solve the above conventional problems, and it is an object thereof to provide a music staging game apparatus, music staging game method, and a readable storage medium thereof capable of realizing a rhythm-matching game with a high game-nature by performing striking operations using multiple of such as the right and left hands, for example.

The music staging game apparatus according to the present invention comprises: a plurality of staging operating means for staging input from a player by at least a striking operation; a storage means for storing data regarding music and staging means for the music; a playing means for playing the music based on the storage contents of the storage means; a staging operation instructing means for visually instructing the player in the staging operating using the staging operating means, following the storage contents of the storage means in a manner synchronous with the progression of the playing by the playing means; a staging effects generating means for generating staging effects corresponding to the staging operation; an evaluating means for evaluating the staging operation based on the correlation between the staging procedures stored by the storage means and the staging operation made by the player; and evaluation display means for displaying information according to the evaluation results of the evaluating means to the player.

According to the above configuration, the staging operation using multiple staging operating means for staging input by the player comprised of at least a striking operation is visually displayed and instructed to the player following the stored contents of the storage means, and sequential striking input is performed with the left and right hands for example for staging of music corresponding to multiple staging operating means, while confirming the operation timing display instructions of the striking operation at least, so a music staging game with higher gaming nature is realized, and also, even though staging operation for music is performed in a percussion instrument playing state closer to reality using at least the right hand and left hand, operating for the music staging is performed based on visual display instructions, so the complexity of the music staging game is lightened, and can be carried out relatively easily.

BRIEF DESCRIPTION OF THE DRAWINGS

FIG. 3A is a plan view illustrating a variation of the drum pad shown in FIG. 2

FIG. 3B is a cross-section view along line IIIB in FIG. 3A.;

DETAILED DESCRIPTION OF THE PREFERRED EMBODIMENTS

The following is a description of embodiments of the music staging game apparatus relating to the present invention, with reference to the drawings.

Figure 1:
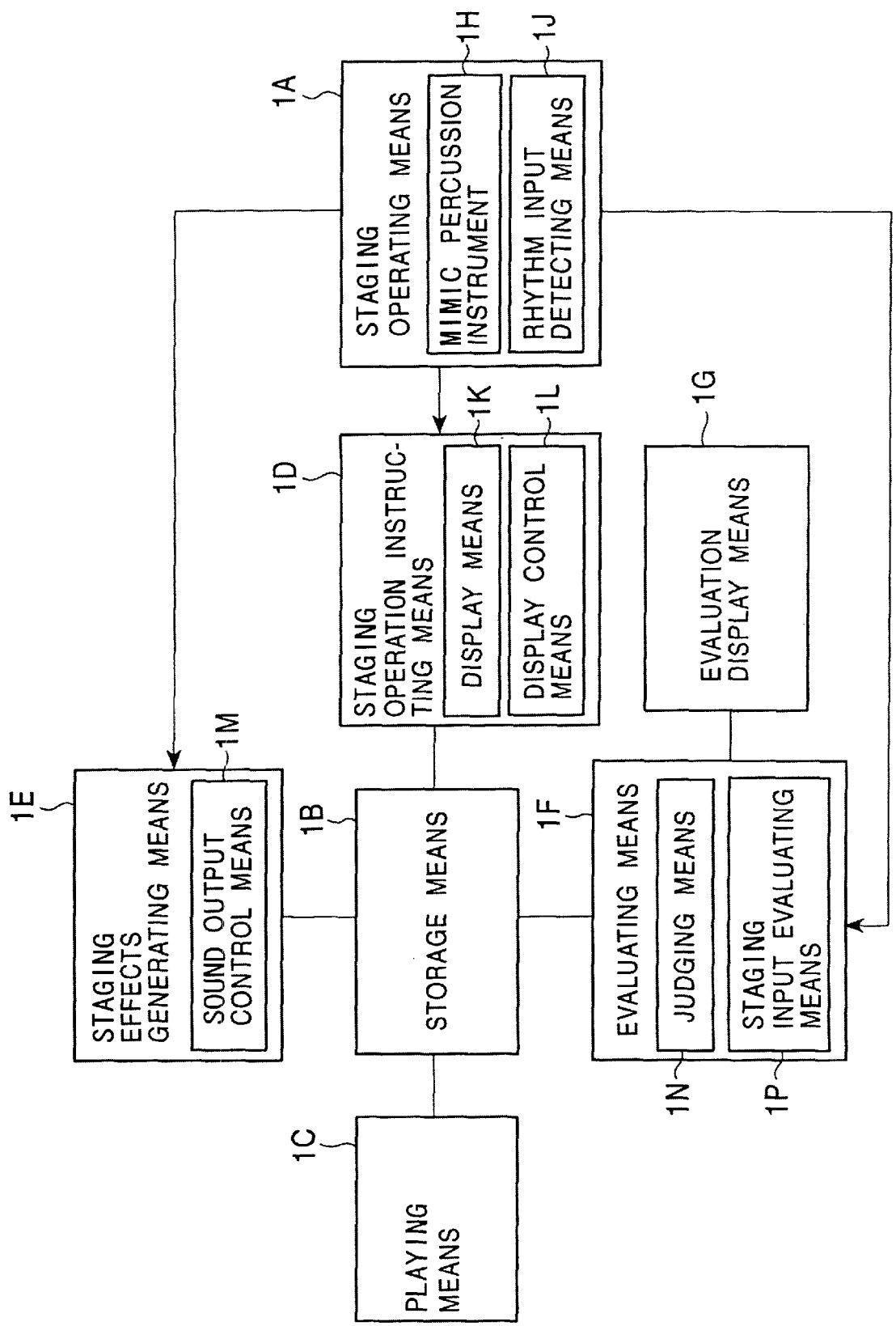
FIG. 1 is a block diagram illustrating the control configuration of the rhythm game apparatus according to an embodiment of the present invention.

FIG. 1 is a block diagram of an embodiment of the rhythm game apparatus according to the present invention. In FIG. 1, the rhythm game apparatus 1 serving as the music staging game apparatus comprises: a plurality of staging operating means 1A for staging input from a player by at least a striking operation; a storage means 1B for storing data regarding music and staging means for the music; a playing means 1C for playing the music based on the storage contents of the storage means 1B; a staging operation instructing means 1D for visually instructing the player in the staging operating using the staging operating means 1A, following the storage contents of the storage means 1B in a manner synchronous with the progression of the playing by the playing means 1C; a staging effects generating means 1E for generating staging effects corresponding to the staging operation; an evaluating means 1F for evaluating the staging operation based on the correlation between the staging procedures stored by the storage means 1B and the staging operation made by the player; and evaluation display means 1G for displaying information according to the evaluation results of the evaluating means 1F to the player.

The staging operating means 1A has a plurality of mimic percussion instruments 1H provided each correlating to the plurality of series of rhythm sounds, and a rhythm input detecting means 1J for receiving the striking operating to the mimic percussion instruments 1H and detecting the operation timing of the corresponding rhythm sound. Though described later in detail with reference to FIG. 2 through FIG. 5, the plurality of mimic percussion instruments 1H are configured of drum pads 7 through 11 and a foot pedal 12, and the rhythm input detecting means 1J is configured of shock sensors 23 provided to the drum pads 7 through 11 and a micro-switch 35 provided to the foot pedal 12. The later-described foot pedal 12 comprises the bass drum foot pedal.

The storage means 1B is comprised of a PCM data storage unit 42 later-described with reference to FIG. 6, a CD-ROM 45, and graphic RAM 47.

The playing means 1C has speakers 3 and 4 serving as a sound generating means described later, for reading and amplifying background music played music piece data of the CD-ROM 45 and outputting this from the speakers 3 and 4.

The staging operation instructing means 1D has a display means 1K such as a monitor 2 as described later with reference to FIG. 6, and a display control means 1L for displaying on the display means 1K multiple types of staging operations for music each correlated in a time-axial direction, as well as visually indicating operation timing instructions indicating timing of the multiple types of staging operations. The display control means 1L is comprised of the later-described main RAM 43, graphic controller 48, and CPU 52.

The staging effects generating means 1E has a sound output control means 1M, configured of main RAM 43 described later with reference to FIG. 6, a sound processor 44, and a CPU 52.

The evaluating means 1F has a judging means 1N for judging whether or not the playing performed along with the music and input by the staging operating means 1A is within a certain time interval, and a staging input evaluating means 1P for comparing the operation timing of the staging operation means 1A with the operation timing instruction given by the display control means 1L, thereby evaluating the staging input from an offset amount. The judging means 1N and staging input evaluating means 1P are comprised of the main RAM 43 and the CPU 52 described later with reference to FIG. 6.

The evaluation display means 1G is comprised of the main RAM 43 described later with reference to FIG. 6, the graphic controller 48, and CPU 52.

Figure 2:
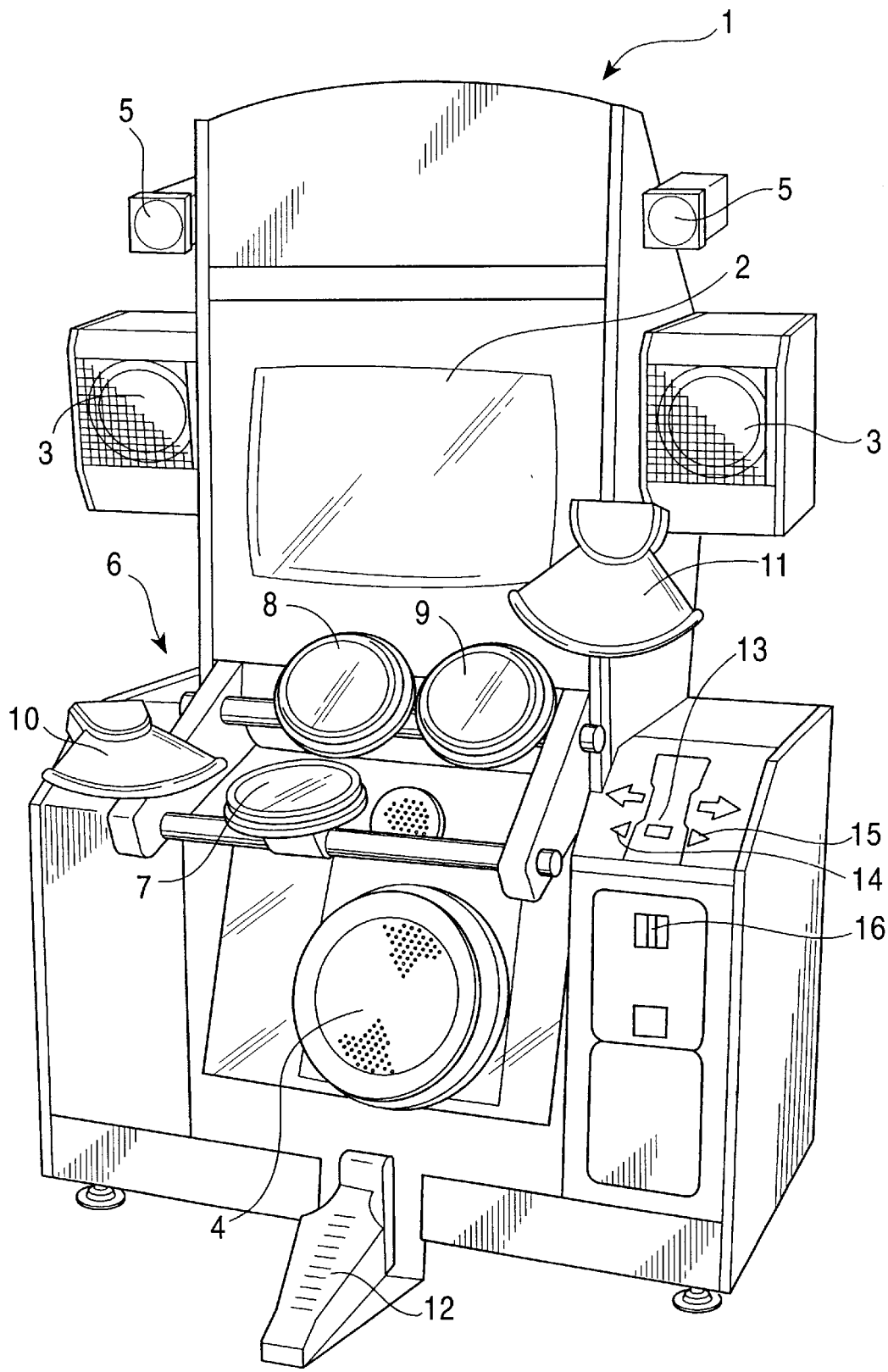
FIG. 2 is an external perspective view of the rhythm game apparatus shown in FIG. 1.

FIG. 2 is an external perspective diagram of the rhythm game apparatus according to an embodiment of the present invention. In FIG. 2, the rhythm game apparatus 1 is provided with a television monitor 2 (hereafter referred to as monitor 2) at the upper center portion of the front of the housing, for performing various types of image output relating to the rhythm game. Also, full-range speakers 3 are provided to both the left and right sides of the monitor 2 for audio output of instrument sound according to striking input instructions of the player along with the background music, and a low-range woofer speaker 4 is provided at the center position of the lower part of the front of the housing. Further, halogen lamps 5 are positioned to the upper right and left positions on the housing of the monitor 2 in order to produce staging effects by blinking and so forth with regard to the played music piece. These speakers 3 and 4 make up the sound generating means serving as the playing means.

Also, the area below the monitor 2 is inclined so that the front of the housing is tilted with the forward direction being lower, thereby forming an array area 6 for multiple mimic percussion instruments, where drum pads 7, 8, and 9 mimicking percussion instruments each having different tones are positioned in an L-formation (these are in an L-formation in the present embodiment, and the drum pads 7, 8, and 9 can be moved to the left or right) from the inclined front portion toward the deeper center portion, and further to the left of the drum pad 7 and to the upper side of the drum pad 9 at the deeper right side are arrayed drum pads 10 and 11 mimicking percussion instruments with differing tones such as cymbals. Further, a foot pedal 12 serving as rhythm input detecting means for a mimic percussion instrument such as a bass drum or the like is provided at the center near side of the lowest portion of the front of the housing. Incidentally, the form of these mimic percussion instruments may be anything, as long as they are capable of mimicking the playing of percussion instruments.

Further, provided to the right side of the array area 6 for the mimic percussion instruments of the rhythm game apparatus 1 is a confirm/start button 13, and selection buttons 14 and 15 on either side thereof, with a coin deposit opening 16 being provided below the position at which these buttons are arrayed.

The internal structure of these drum pads 7 through 11 will be described. The drum pads 7 through 9 have a circular external plan-view form, but such with generally half-circle shapes for the external plan-view form such as shown in FIG. 3A may be employed in the same manner, and the internal structure in this case will be described.

As shown in FIG. 3B which is a cross-sectional view along line IIIB—IIIB in FIG. 3A, an inner metal plate 22 is provided at the rear side of a rubber pad 21 of the drum pad at the generally center portion, and a shock sensor 23 is provided to the rear side of the inner metal plate 22. The shock sensor 23 serving as rhythm input detecting means for detecting striking comprises an acoustic sensor, which detects striking of the surface of the rubber pad 21 with a stick at the striking operation timing thereof, and control is performed so as to cause an LED (Light Emitting Diode) 25 to emit light for an instant via a control circuit on the control board 24 due to that detection signal, and further, that detection signal can be externally extracted at the striking operation timing. The control board 24 is stored within a board case 26, and the board case 26 is attached to a transparent acrylic plate 27. The acrylic plate 27 is somewhat larger than the rubber pad 21 shown in FIG. 3A and is provided so as to frame the perimeter thereof in a flange-like manner. The acrylic plate 27 is provided so as to face a circular array of LEDs 25, such that the light emitted by the LEDs 25 pass through the acrylic plate 27 and cause the edge portion extending from the perimeter of the rubber pad 21 to emit light.

Figure 4:
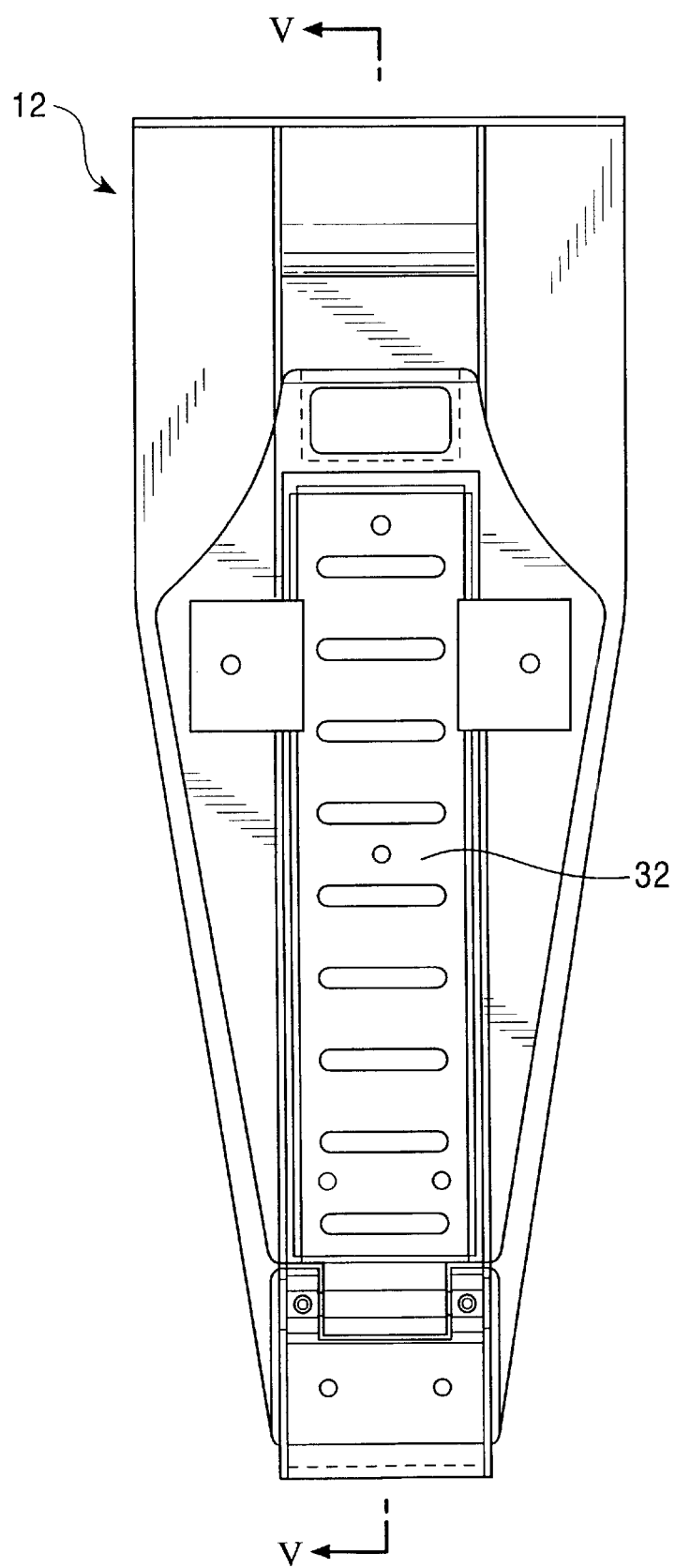
FIG. 4 is a plan view of the foot pedal shown in FIG. 2.
Figure 5:
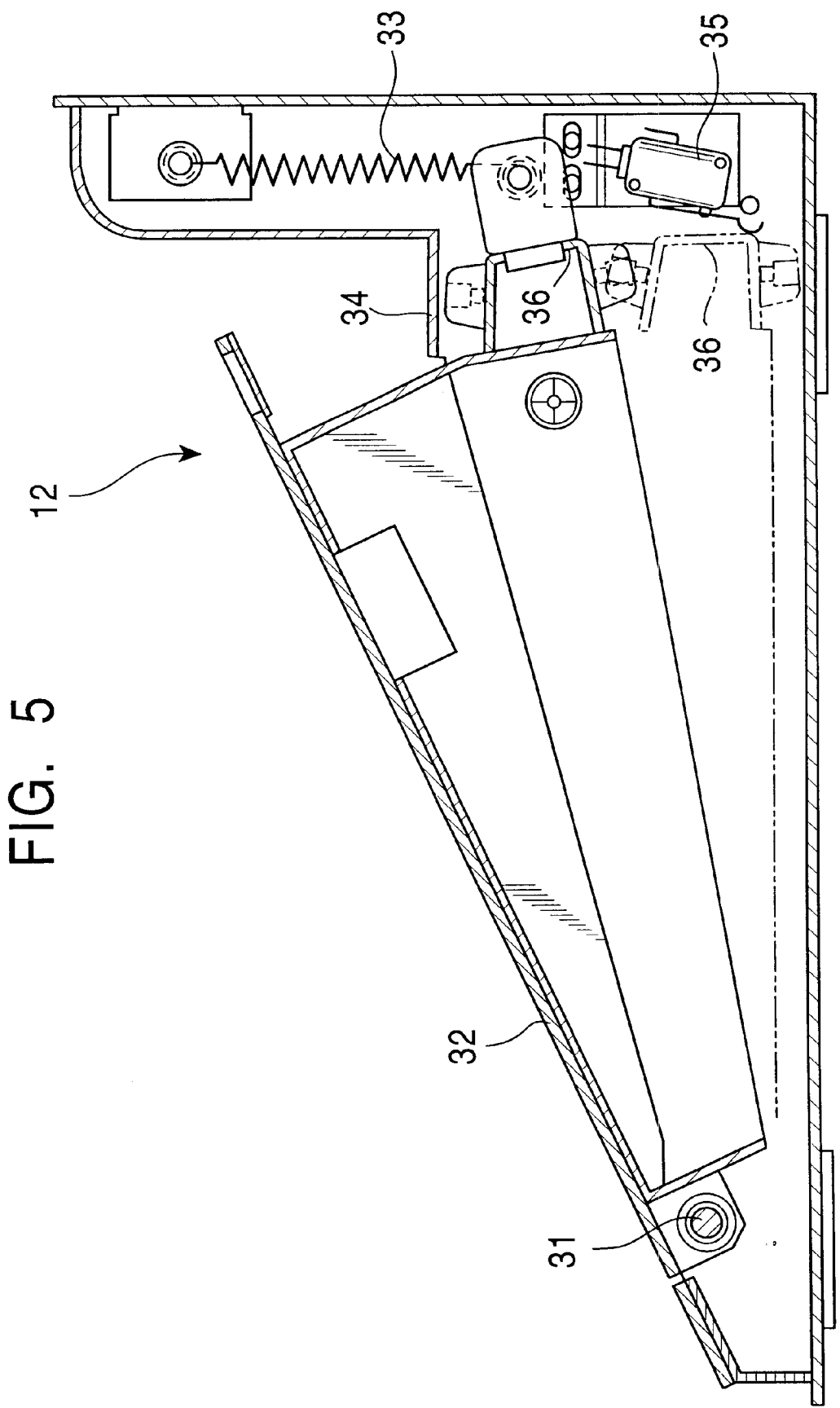
FIG. 5 is a cross-section view along line V—V in FIG. 4.

The interior structure of the foot pedal 12 will be described. In FIG. 4 and FIG. 5, the foot pedal 12 has a pedal 32 which has one end thereof axially supported to as to rock vertically with a shaft 31 as the center of rotation thereof, an elastic member 33 is retained at the tip portion of the pedal 32 at the side opposite to that of the shaft 31 for biasing the pedal 32 upwards, a stopper member 34 for restricting the rotation of the pedal 32 biased by the elastic member 33, a micro-switch 35 for detecting stepping on the pedal 32, and an actuator 36 for coming into contact with an operating piece of the micro-switch 35 at the time of the pedal 32 rotating (at the time of stepping, shown by a double-dotted broken line) so as to cause this to move, thereby controlling on/off switching of the switch 35.

In this way, the configuration is such that one player stands and plays the drum set comprised of the drum pads 7 through 11 and the base drum foot pedal 12 with sticks in both hands along with the rhythm, using both hands and the right foot. The vertical position and inclination angle can be adjusted so that, in the case of playing in a sitting position, the height of the drum set is optimal in the event that a chair is provided and the player sits. That is to say, the frame member 17 to which the drum pads 7 through 9, 10, and 11 making up the inclined mimic percussion instrument array area 6 is axially supported at the deep side and also is configured so as to be vertically movable within a certain vertical range, and can also be adjusted regarding inclination toward the front of the array area 6.

Figure 6:
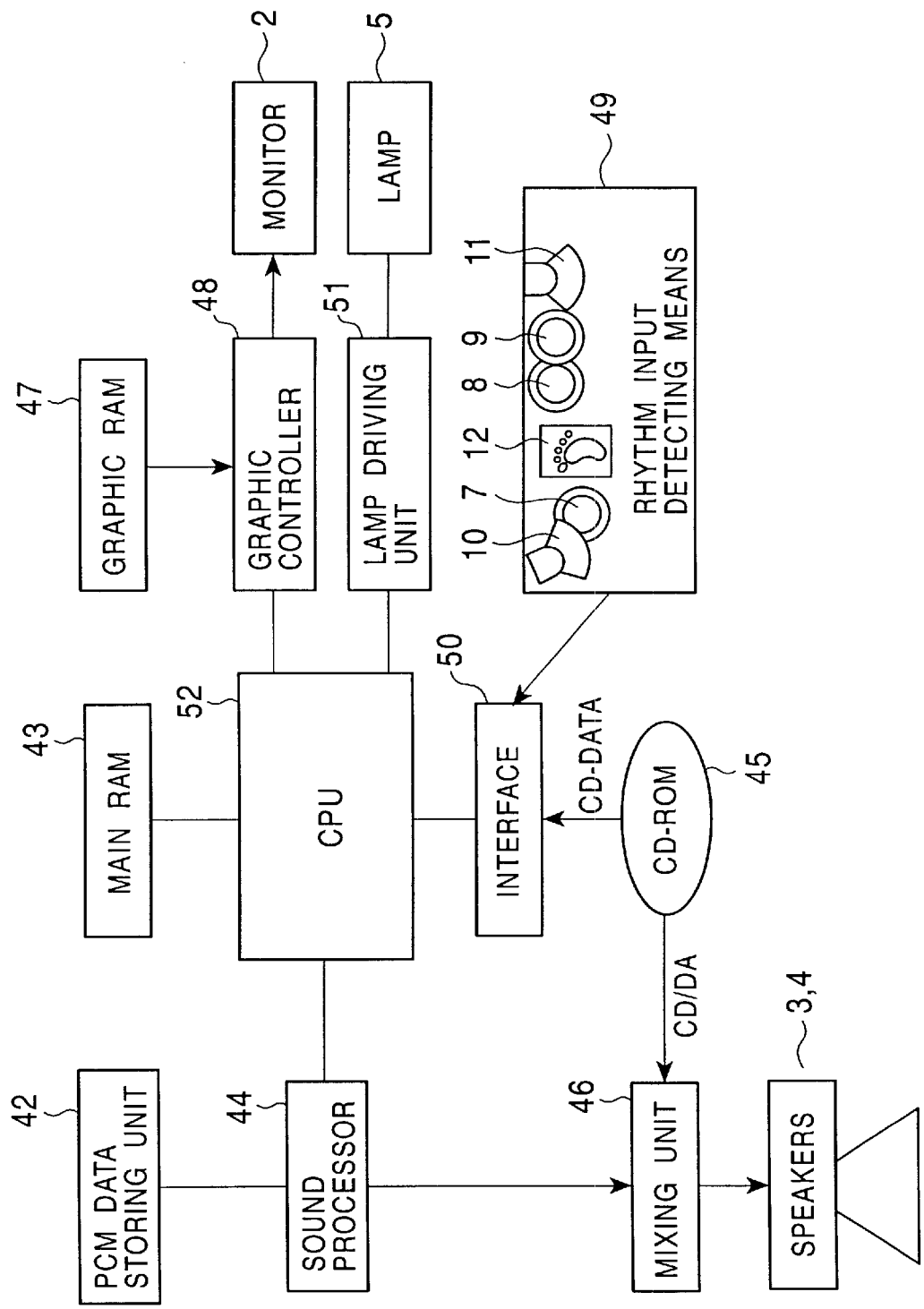
FIG. 6 is a block diagram illustrating the control configuration of the rhythm game device shown in FIG. 2.

FIG. 6 is a block diagram illustrating the hardware configuration for the rhythm game apparatus 1. In FIG. 6, the hardware configuration for the rhythm game apparatus 1 comprises a PCM data storage unit 42, main RAM 43 capable of reading and writing various types of data, a sound processor 44 connected to the PCM data storage unit 42 for extracting sound emission data from the PCM data storage unit 42 and performing sound emission control, a mixing unit 46 connected to the sound processor 44 for mixing the later-described sound emission data from the sound processor 44 and the background music data from the CD-ROM and outputting this to the speakers 3 and 4 so as to serve as a sound gene rating means, graphic RAM 47 serving as graphic storing means for storing image data for the monitor 2, a graphic controller 48 connected to the monitor 2 for extracting the image data within the graphic RAM 47 and performing display control thereof on the monitor 2, an interface 50 for receiving input signals from the rhythm input detecting means 49 and the CD-ROM 45, a lamp driving unit 51 connected to the lamps 5 for performing lighting of the lamps 5, and a CPU (Central Processing Unit) 52 for controlling each part. The graphic RAM 47 makes up the graphic storing means, and the graphic controller 48 and CPU 52 make up the graphic controlling means for performing image output control to the monitor 2.

The PCM data storage unit 42 correlates multiple types of sound data (sound data with differing tones or multiple pieces of sound data) with the type of sound and thus stores the sound data. With sound data for such played music pieces, 12 to 15 music pieces for all play levels are stored in the PCM data storage unit 42. Also, with regard to this sound data, information indicating the sector number, sound emission duration, etc., is stored in the PCM data storage unit 42. Also, the graphic RAM 47 stores screens relating to a notes display 53 of the game screen shown in FIG. 7 and FIG. 8, and the CPU 52 controls the graphic controller 48 to divide the rhythm sound (notes bar 54 correlating to the rhythm sound), regarding a played music piece configured containing at least rhythm sound, into certain intervals (may be different or the same for each sound) in the time direction C, and extracts screens of the notes display 53 from the graphic RAM 47 so as to make the display on the monitor 42, such that a display instruction is made for each sound on the notes bar 54 of a series of rhythm sounds constructed by distributing multiple types (with the present embodiment, there are 6 types of mimic percussion instruments) of series of rhythm sounds on the same time axis.

Also, the CD-ROM 45 serving as the storage medium stores background music data for the played music piece, and further stores the selection sound emission data (type of drum pad) for each sound of the played music piece and the output timing data (sound number), and is configured of a so-called ROM cassette, wherein a ROM or the like storing score data according to the later-described degree of matching with these, as well as program data such as the control programs for the rhythm game and the operating system is housed inside a plastic case. The recording medium may be configured with an optical disk, flexible disk, etc., instead of the CD-ROM 45.

Figure 7:
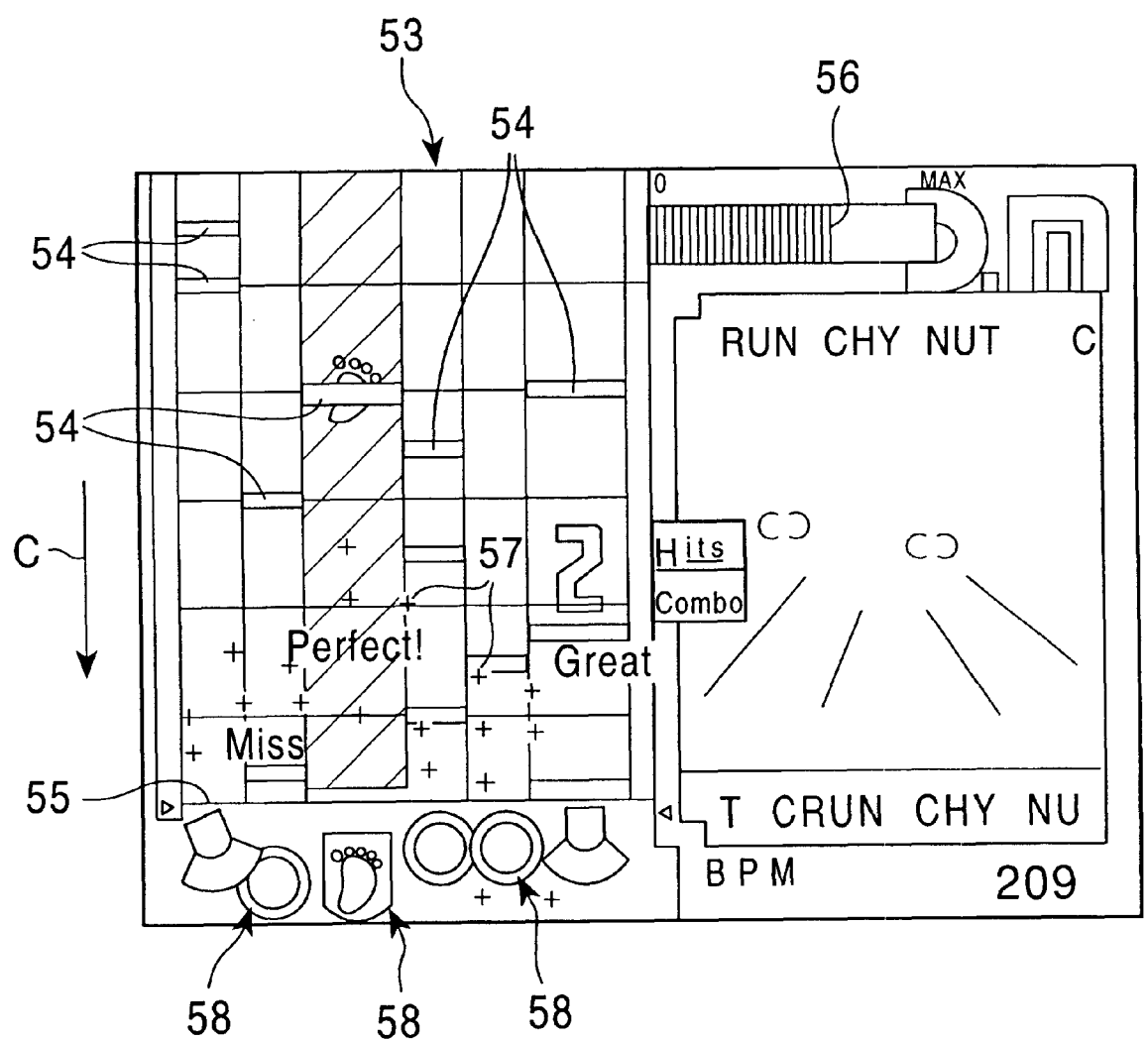
FIG. 7 is a diagram illustrating an example of the game screen displayed on the monitor shown in FIG. 6.
Figure 8:
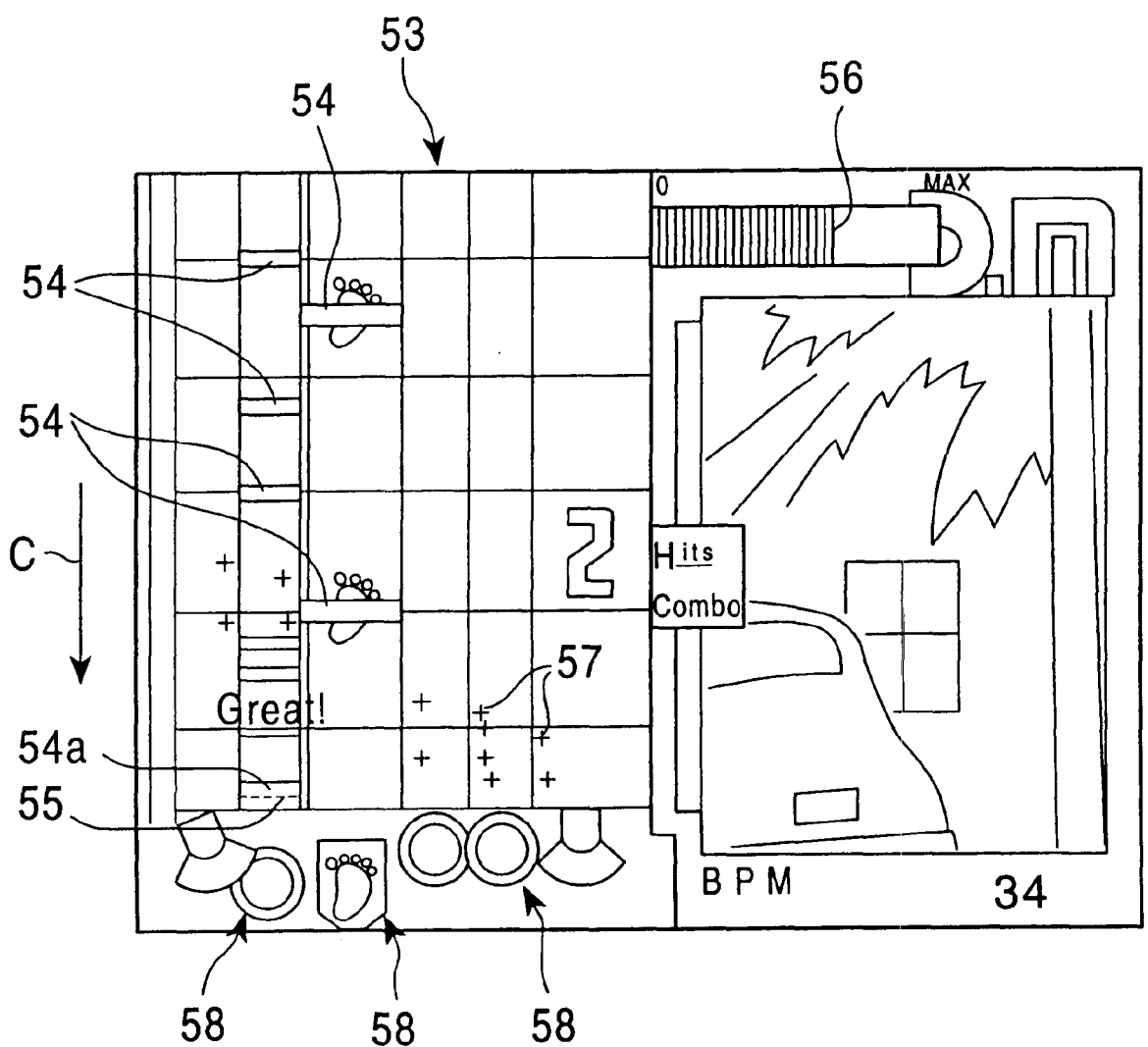
FIG. 8 is a diagram illustrating another example of the game screen displayed on the monitor shown in FIG. 6.

Further, as with the PCM data storage unit 42, the graphic RAM 47 stores data for the notes screen 53 such as shown in FIG. 7 and FIG. 8 for example for performing display instruction of rhythm striking input, for visually guiding the rhythm striking input by the type of mimic percussion instrument. That is, the notes screen 53, such as shown in FIG. 7 and FIG. 8, is displayed as notes bars 54 which are operating timing components for each rhythm sound corresponding to each played music piece (BMG). The series of notes bars 54 indicating a series of rhythm sounds are arrayed in the vertical direction, such that the notes bar for each rhythm sound sequentially moves downwards along as each played music piece progresses. The display indicates the operating timing for the player to operate an instrument by which the notes bar for each rhythm sound reaches a horizontal reference line. The display instruction of the operating timing is arrayed vertically in columns which correlate horizontally with the type of mimic percussion instrument. At the bottom of each vertical array there is a mark 58 for the mimic percussion instrument corresponding thereto. The vertical array of a series of rhythm sounds, i.e., the mark array of mimic percussion instruments matches the array of the drum pads 7 through 11 of the actual rhythm game apparatus 1. Also, the graphic RAM 47 stores screens dealing with game states as shown below (e.g., see FIG. 7 through FIG. 18) and various types of data relating thereto, in addition to the data for the notes screen 53.

The CPU 52 reads data relating to the program data within the CD-ROM 45 (score data, selection generation sound data, output timing data, etc.) from the CD-ROM 45 at the time of start-up, with an unshown reading device, and writes this to the main RAM 13.

Figures 9, 10:
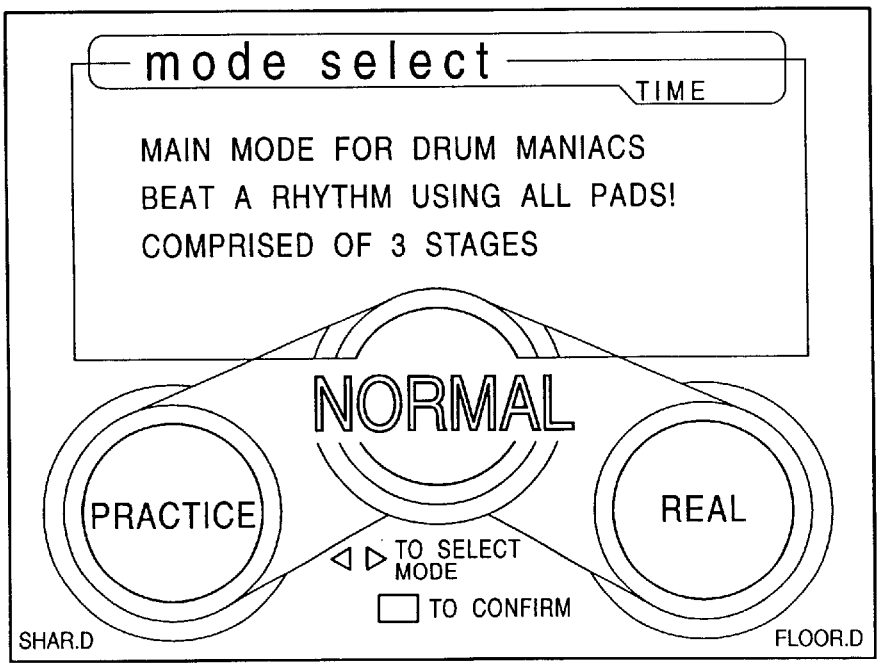
FIG. 9 is a diagram illustrating an example of the warning screen displayed on the monitor shown in FIG. 6.
FIG. 10 is a diagram illustrating an example of the normal mode having been selected in the mode selection screen displayed on the monitor shown in FIG. 6.
Figure 11:
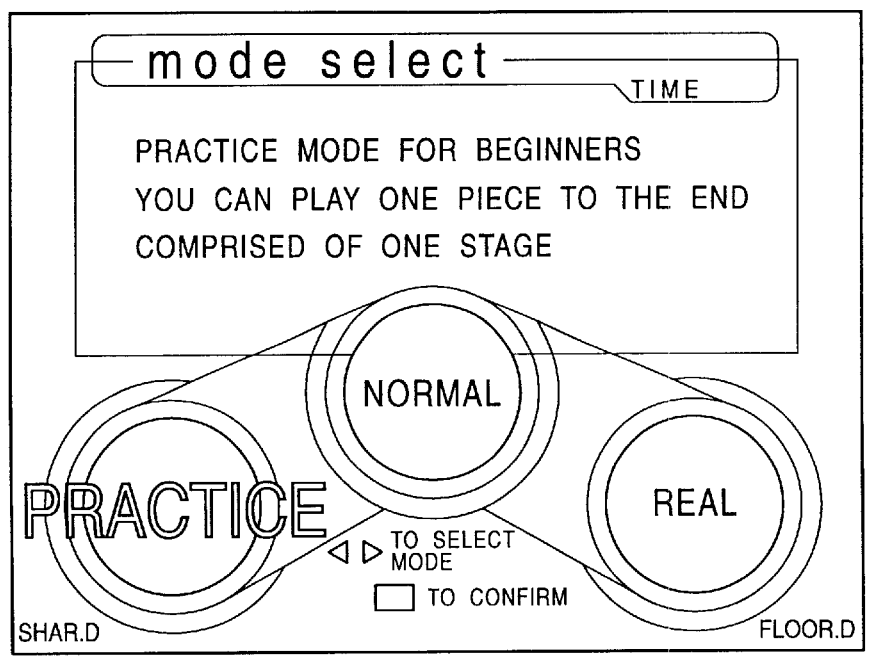
FIG. 11 is a diagram illustrating an example of the practice mode having been selected in the mode selection screen displayed on the monitor shown in FIG. 6.
Figure 12:
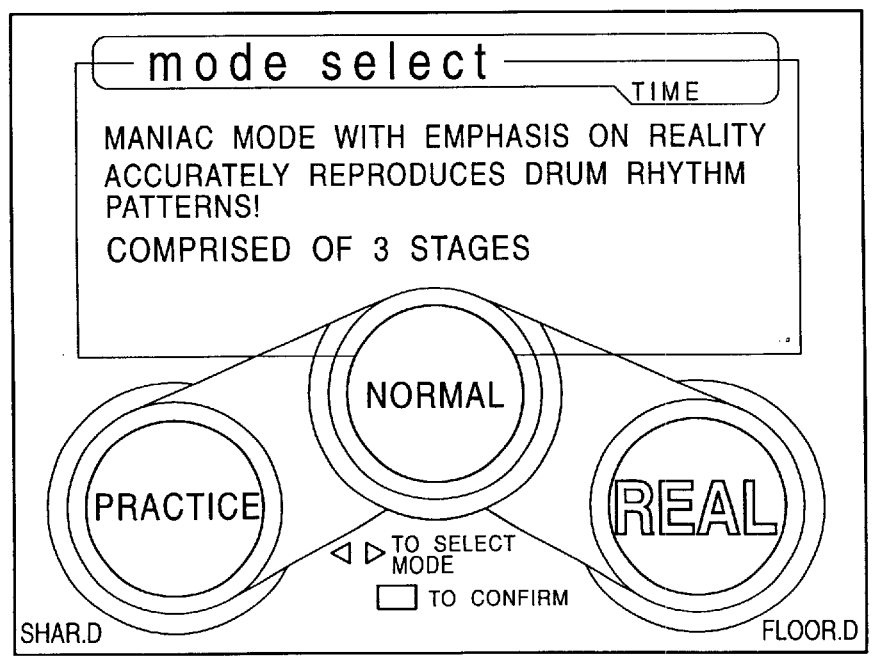
FIG. 12 is a diagram illustrating an example of the real mode having been selected in the mode selection screen displayed on the monitor shown in FIG. 6.
Figure 13:
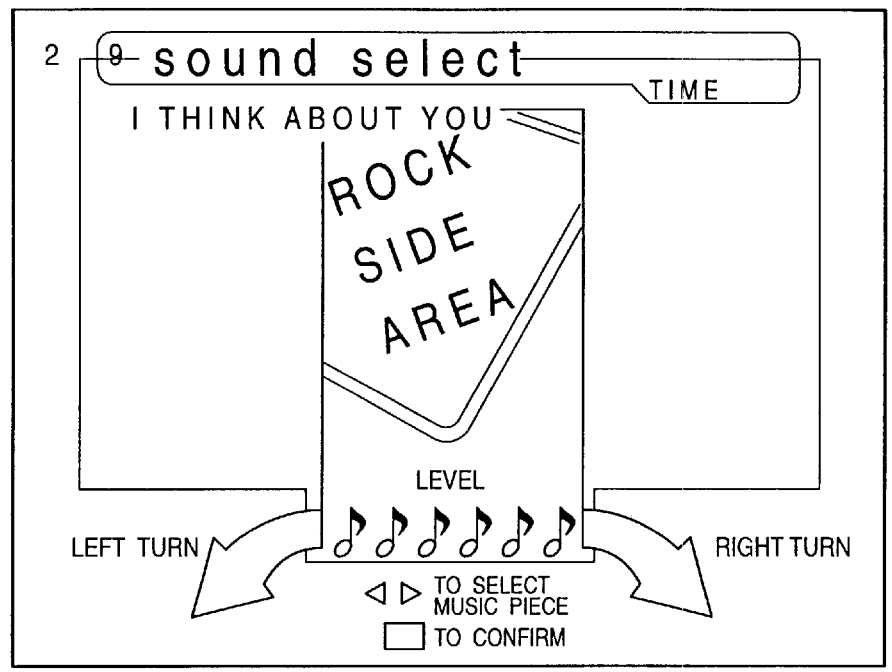
FIG. 13 is a diagram illustrating an example of the sound selection screen displayed on the monitor shown in FIG. 6.
Figure 14:
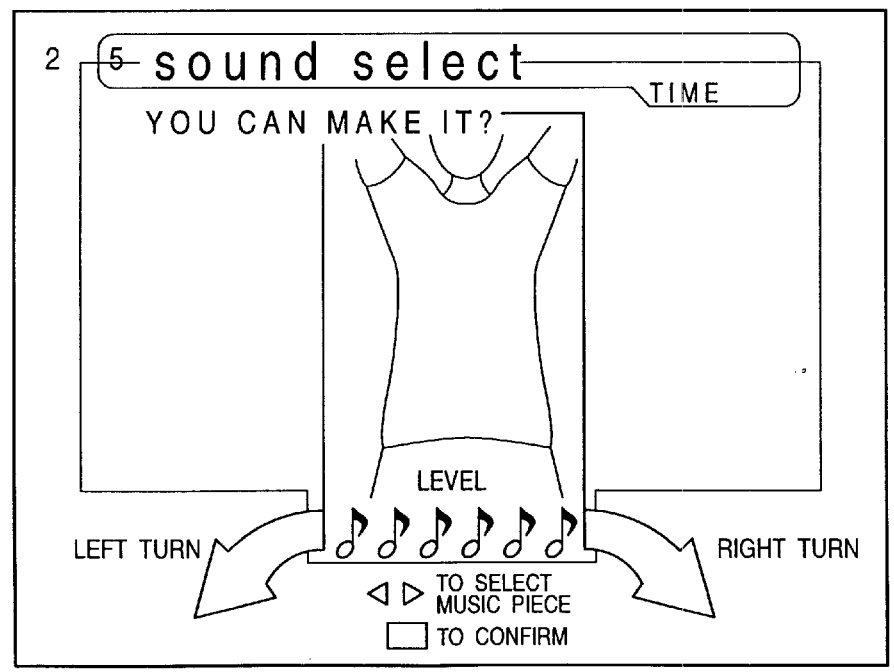
FIG. 14 is a diagram illustrating another example of the sound selection screen displayed on the monitor shown in FIG. 6.
Figure 15:
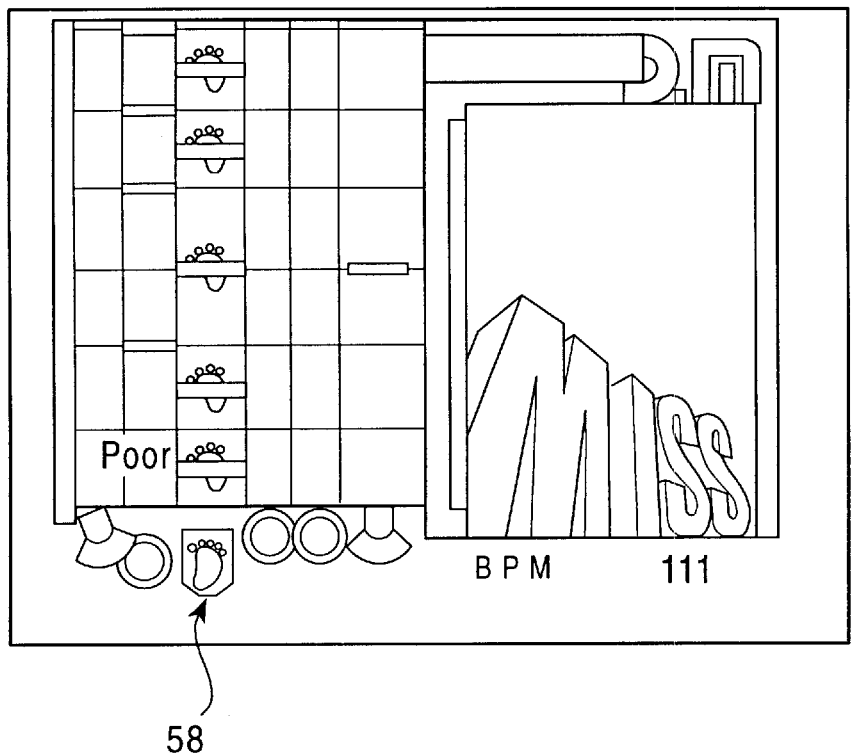
FIG. 15 is a diagram illustrating an example of the miss screen displayed on the monitor shown in FIG. 6.

Also, based on the control program, the CPU 52 controls the graphic controller 48 and extracts necessary image data (mode selection screen) from the graphic RAM 47 which is displayed on the monitor 2, and performs the mode difficulty selection processing and the stage selection processing, by means of the player making selection with the selection buttons 14 and 15, and confirming with the confirm/start button 13. Based on the instruction command from the player with the selection buttons 14 and 15, mode selection screens such as shown in FIG. 10 through FIG. 12 or sound selection screens such as shown in FIG. 13 and FIG. 14 are displayed. Incidentally, regarding the mode difficulty selection processing, the present embodiment uses the selection buttons 14 and 15 and the confirm/start button 13, as described above, but the present invention is not restricted to such; rather, an arrangement may be used wherein the difficulty mode is selected by the player striking the drum pads 7 through 9 and confirming the selected mode with the foot pedal 12. For example, the mode selection screen shown in FIG. 10 would be come up in the event the normal mode is selected by striking the drum pad 7 with a stick, the mode selection screen shown in FIG. 11 would be come up in the event the practice mode is selected by striking the drum pad 8 with a stick, and the mode selection screen shown in FIG. 12 would be come up in the event the real mode is selected by striking the drum pad 9 with a stick.

In the mode difficulty selection processing, there are four modes provided; the practice mode for beginners, the normal mode for medium level, the real mode for advanced, and the expert mode which is the highest level. With the practice mode or normal mode, the combinations of hands and feet are restricted to basically only both hands, or to the right foot and left hand (or right hand), and the setting is arranged such that similar rhythm patterns are repeated due to the nature of the beginner level, with occasional feint rhythms and phrases with increasing complexity making for the nature of the game. Also, with the real mode and expert mode, fast tempo and advanced level stick-handling using at least both hands is required, and the setting is arranged such that the game nature is a challenge for advanced buffs. Particularly, with the expert-real mode, the touch intensity in striking the drum pad is required. That is to say, the judgement evaluation in the rhythm game is not only for the timing for the drum pad striking operation, but touch intensity of the striking operation is contained in the judgement evaluation as well.

Also, with the stage selection processing, a sound selection screen such as shown in FIG. 13 and FIG. 14 displayed on the monitor 2, and is arranged such that the player selects the played music piece using the selection buttons 14 and 15 and the title displayed on the display screen is confirmed as the selected music piece with the confirm/start button 13. Also, multiple note symbols corresponding to the difficulty level of the played music piece are arrayed horizontally and displayed on the monitor 2. Each time the selection button 14 is pressed, the title corresponding to the next played music piece is displayed on the monitor 2. Also, each time the selection button 15 is pressed, the movement is in the reverse direction (to the right) as compared to the selection button 14. For example, the title portion of the screen on the monitor 2 shown in FIG. 13 has displayed the title "I THINK ABOUT YOU" of the played music piece, and this is in a state of being selected. In the event that this selected piece is suitable, the confirm/start button 13 is pressed following the operation guidance on the display screen, and the played music piece is confirmed.

Also, the CPU 52 comprises: judging means for judging whether or not sound data according to the type of mimic percussion instrument input-detected and input-instructed with the drum pads 7 through 11 and bass drum foot pedal 12 has been instructed as striking or pedal operation timing within the certain interval, following the sound generation output control procedures of the control program; and sound output control means for extracting one piece of sound emission data of a played music piece from the PCM data storage unit 42 with the sound processor 44 according to the type of mimic percussion instrument from the drum pads 7 through 11 and foot pedal 12, and the output timing thereof (sound number), and outputting this to the mixing unit 46, mixing the one piece of sound emission data and the background music data from the CD-ROM 45 and conducting sound emission output from the speakers 3 and 4, in at least a state that the judging means has affirmed (instructed as striking or pedal operating timing within the certain interval); and has display control means for updating the data on the notes screen 53 according to the flow of the time-system of the played music piece, and also for performing display control on the monitor 2 regarding the level of matching in the striking with the sticks or pedal operation on the mimic percussion instruments such as the later-described "Perfect", and whether or not there has been a miss in the input, following the notes display control means of the control program; and rhythm input operation evaluating means for comparing the timing of the striking or pedal operation on the mimic percussion instruments with the sound emission data for playing and output timing data, and for evaluating the rhythm input from the score data according to the latter-described degree of matching, thereby adding to the score, following the rhythm input operation evaluation procedures of the control program. The sound output control means has a later-described offset amount detecting means and sound emission control means.

The sound output control processing and display control processing will be described in detail. The CPU 52 obtains the next CD sector number for the music piece played from the CD-ROM 45 via the interface 50, and controls the graphics controller 48 based on the obtained CD sector number to read in image data from the graphic RAM 47 which is the graphic storage means and updates the next notes display 53, and displays the updated notes display 53 on the monitor 2 as shown in FIG. 7 or FIG. 8. That is to say, the configuration is such that, during execution of the program, the sector number which the CD head is pointing to is obtained for each interruption, and the notes display 53 shown in FIG. 7 or FIG. 8 is moved downwards according to the time value of that sector number. A sound input display instruction for the player to conduct striking with the stick or pedal operation occurs when the notes bar 54 for each of the mimic percussion instrument drum pads 7 through 11 and foot pedal 12, reaches the reference line 55.

In this way, the player inputs command signals to the CPU 52 by striking the mimic percussion instrument drum pads 7 through 11 with sticks held in the right and left hands or operating the foot pedal 12 with the pedal, along with the background music, while confirming the notes display 53 to the left side of the monitor 2 in FIG. 7 or FIG. 8, for example. At this input time, at the point that there has been input of the command signal within the certain timing period, the CPU 52 calculates the degree of matching with the sound data in a table.

Figure 17:
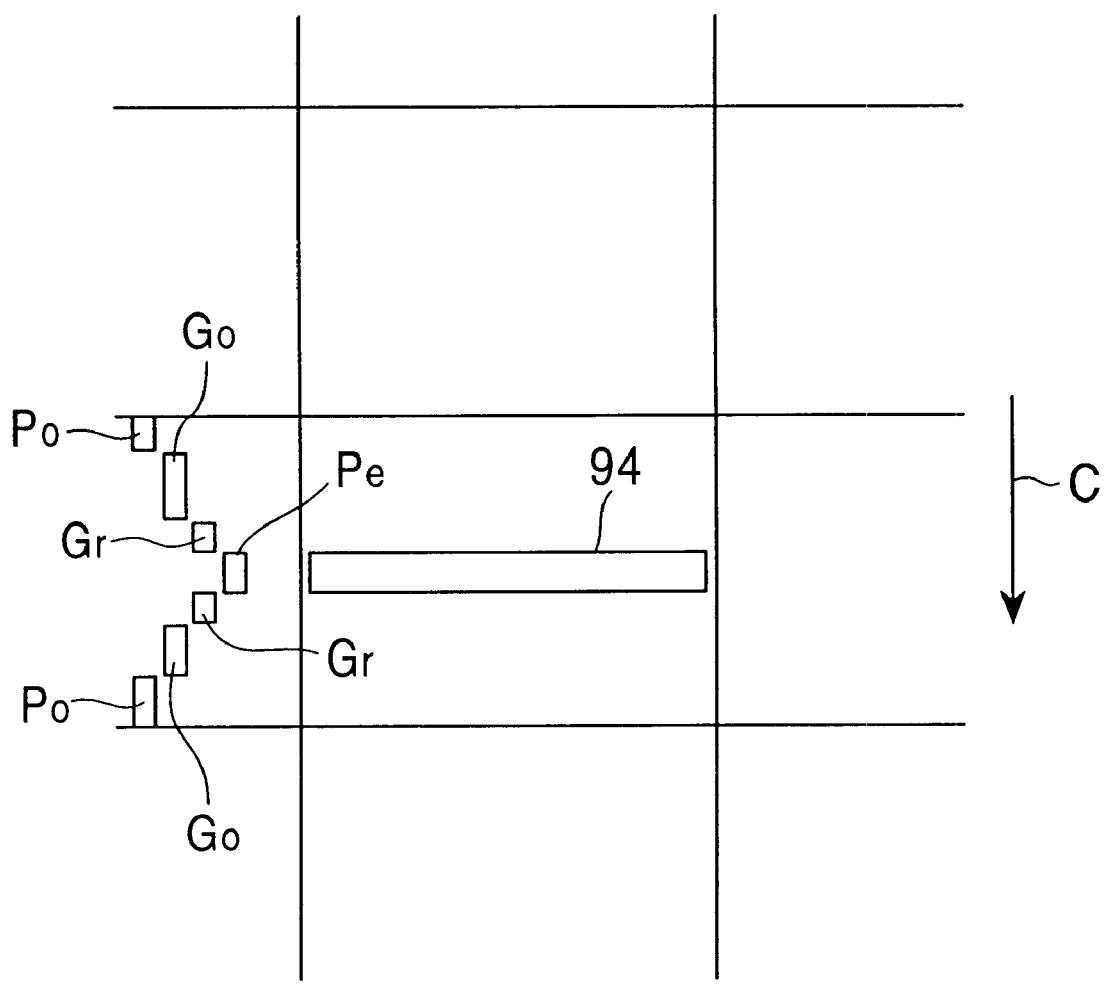
FIG. 17 is a notes display diagram for explaining the stepped evaluation regarding timing offset for the striking or pedal operation as to the notes bar.

This degree of matching (amount of matching) is the extent to which the input timing of striking the mimic percussion instrument drum pads 7 through 11 with sticks or operating the foot pedal 12 with the pedal matches the display instruction timing displayed as notes. For example, in the event that a sector number obtained at the input time of stick striking or pedal operating and the sector number of the corresponding sound data are within a certain interval, and the input instruction has been made for the same type of mimic percussion instrument (drum pads 7 through 11 and foot pedal 12) in a matching amount table, the sound data corresponding to the sound number within the same matching amount table is output as sound for the duration of the sound emission thereof. In the event that the "within the certain interval" criteria means within the time width Pe which is generally the same as the sound duration corresponding to the notes bar 54 in the notes display 53 as shown in FIG. 17, an evaluation level of "Perfect" is selected from multiple levels (with the present embodiment there are 4 evaluation levels) set, in the event that this is within the time width Gr set before and after the time width Pe, the evaluation is "Great", in the event that this is within the time width Go set before and after the time width Gr, the evaluation is "Good", and in the event that this is within the time width Po set before and after the time width Go, the evaluation is "Poor". The superiority or inferiority of this evaluation level is displayed to the player by changes in graphics representing the notes, or temporarily displaying characters representing the evaluation. Also, the time width at the trailing side of this "Poor" has been made to be somewhat longer than as compared with other time widths (the time width set for "Perfect", "Great", and "Good"), and the time of a pedal operation has been made to be somewhat longer than as compared with other time widths (the time width set for the striking operation). Also, in the event that the player misses a notes bar 54 and does not perform the a striking or pedal operation within the certain time interval, i.e., in the event that there is no input instruction within the certain interval, this constitutes a "Miss", so that a strike outside of the time width Po in the free zone (the inter-line area time-divided every 16 notes, where no notes bars 54 exist), there is no judgement. An arrangement may be made wherein there is no output of rhythm sound even in the event that the player ad-libs and performs strike inputting in this free zone, but with the present embodiment, a warning sound (a miss sound) for notifying that the operating timing is off, is output. In this way, a warning sound (a miss sound) is output in the event that the amount of offset in degree of matching is great, and in the event that this is not the case, a normal sound chord is sounded. Also, the warning sound (miss sound) is an appropriate combination of normal sound chords, and a sound that is not irksome is preset for each music piece or mode.

In the event that there is striking or pedal operation within the "Perfect" or "Great" time, fireworks 57 indicating congratulation are displayed on the notes display screen as shown in FIG. 7 and FIG. 8, and the halogen lamps 5 blink, with the characters "Perfect" or "Great", indicating the degree of matching, flowing along the vertical lines of the mimic percussion instrument, and the mark 58 of the mimic percussion instrument shining.

At this time, the notes bar 54a itself blinks intensely only for the instant of the striking or pedal, operation, as shown by the notes bar 54a which has reached the reference line 55. Also, in the event that there is striking or pedal operation within the "Good" or "Poor" time width, the characters "Good" or "Poor" are displayed on the vertical display area in the notes display 53 for the mimic percussion instrument which was operated, and only the perimeter of the mark 58 for the mimic percussion instrument which was "Good" or "Poor" shines. Further, in the event that the strike or pedal operation is within the certain time interval, in the event that the type of mimic percussion instrument is wrong, there is no sound output, and no related display. The display on the monitor 2 at this time is also "MISS" shown in FIG. 15 which represents a miss, on the vertical line for the mimic instrument. In this way, the sound data for the sound which the player has selected the mimic percussion instrument at the input instruction timing of striking the mimic instrument with the stick or pedal operation is obtained by the CPU 52 controlling the sound processor 44 from the PCM data storage means 42, and the sound is emitted via the speakers 3 and 4.

Also, the vertical line of the display instruction for the pedal operation is shining white, and further the vertical line for the pedal operation is positioned at the general center, so the visual recognition thereof is much better than that of the other drum pads.

The rhythm input operation evaluating process will be described in detail. The CPU 52 follows the rhythm input operation evaluation procedures of the control program and the game data to extract and calculate score points from the scores table according to various conditions, such as the amount of offset from the reference timing range of the input instruction timing of striking the mimic percussion instrument with the stick or pedal operation (the levels in degree of matching), mistakes in the type of mimic percussion instrument at this time, whether or not a series of continuous operation inputs are of a certain level in the degree of matching (bonus points are set for cases wherein there is continuous operation input within the time width of "Perfect" and "Great"), cases wherein there is no input of instruction signals which should have been within the certain timing period. For example, in the event that the operation timing of the instruction signals is within the same time width Pe as to the notes bar 54 of the notes display 53, this is "Perfect" and the score is +2, in the event this is within time width Gr, this is "Great" for +1, in the event this is within time width Go, this is "Good" for ü}0, in the event this is within time width Po, this is "Poor" for –5, and in the event that the striking or pedal operation is not performed but the notes bar 54 is missed, this means a "Miss" for –10. In the event that the degree of matching is off any greater than this, the judgement does not count.

Figure 16:
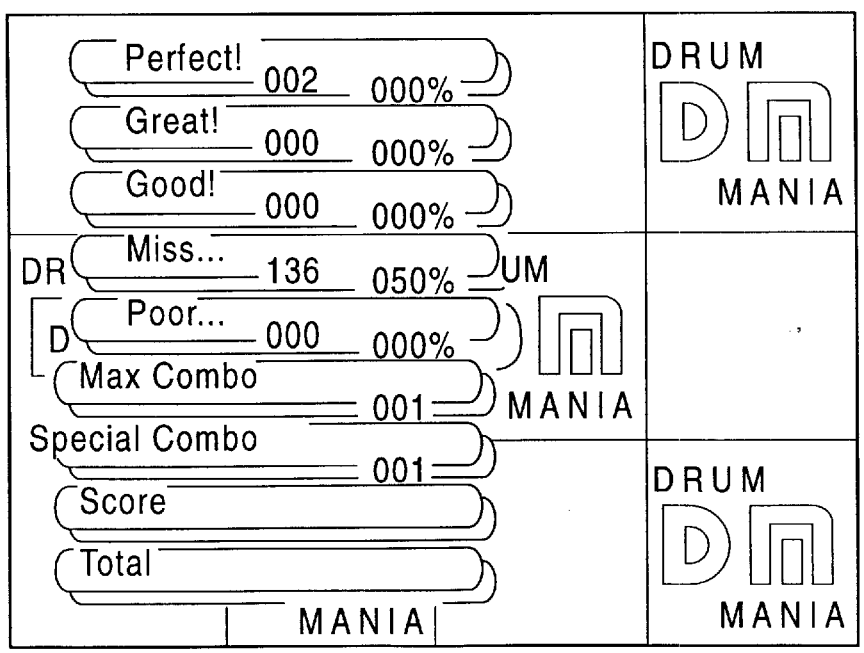
FIG. 16 is a diagram illustrating an example of the grades display screen displayed on the monitor shown in FIG. 6.

Also, the CPU 52 is arranged so that accumulation calculation is performed such that the gauge amount is decreased in the event that the operation timing of the player to the mimic percussion instrument is within the "Poor" time width or in the case of a "Miss", and the gauge amount is increased in the event that the operation timing is within the "Perfect" or "Great" time width. Based on the gauge amount calculation results and the score calculation results, the calculating score is added to the accumulated score and updated and stored in the main RAM 43, and at the same time the calculated gauge amount is reflected in a horizontal bar graph 56 on the monitor 2 as shown in FIG. 7 and FIG. 8, with the length thereof in a certain direction being changed and thus displayed accordingly. The CPU 52 controls the graphic controller 48 such that in the event that the updated gauge amount is gone, a display such as "Game Over" is displayed on the monitor 2 and the game is force-quit, and a grades display screen such as shown in FIG. 16 for example is displayed on the monitor 2.

The operation of the above configuration will be described below.

First, the peripheral demo will be described. First, a warning screen shown in FIG. 9 displaying a warning text such as age restriction or the like is displayed on the monitor 2, an opening video is displayed, the title of this rhythm-matching game is displayed, and further, how to play this rhythm-matching game (operation method) is described. Also, a demo of a noted music piece is performed. That is to say, the number of times that each piece has been selected in the rhythm game is recorded following data initialization once every certain period such as a week, and that data is used to read the date and time, and a piece matching that period such as the season, day of the week, or the like is introduced, and also the piece with the greatest number of selections when demo looping is output as audio as the "number 1 popular piece". Further, the name of the high-score player and the high score thereof for the week is displayed in order of high score, thus performing a ranking demo. Subsequently, the flow returns to the warning screen. Incidentally, the rhythm game apparatus 1 is arranged such that the player name can be input from input means (not shown) in the event that a certain high-score value is passed.

In the event that a coin of a certain monetary value is deposited from the coin deposit opening 16 during the above routine, the title of the rhythm game is displayed on the monitor 2, following which the CPU 52 controls the graphic controller 48 based on the control program to extract necessary mode selection image data such as shown in FIG. 10 from the graphic RAM 47, and display this on the monitor 2.

Figure 18:
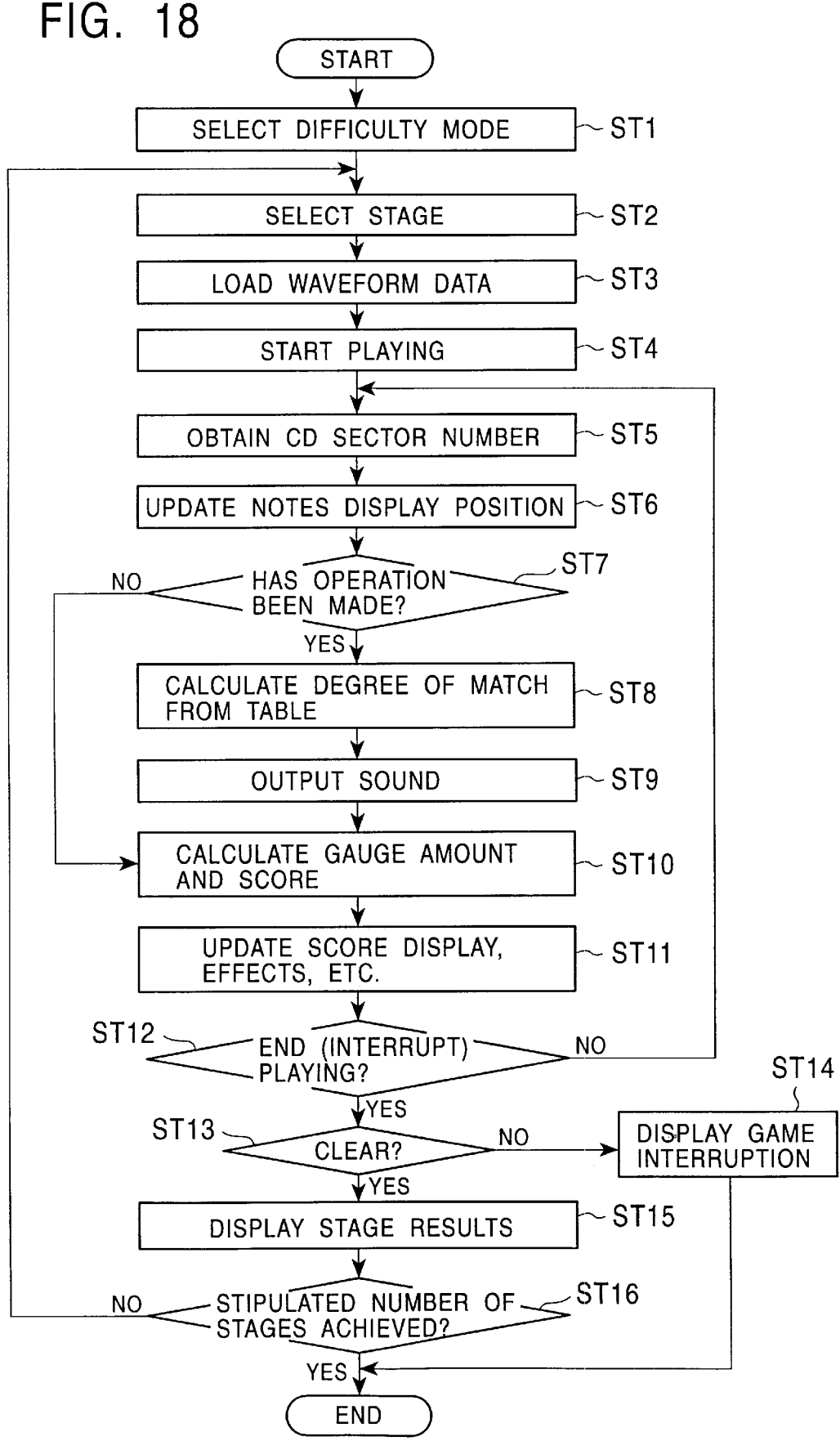
FIG. 18 is a flowchart illustrating the operation of the rhythm game apparatus shown in FIG. 1.

FIG. 18 is a flowchart showing the operations of the rhythm game apparatus in FIG. 1. As shown in FIG. 18, first, in step ST1, difficulty mode selection processing is performed. That is, the player pressing the selection button 14 once from the normal mode state shown in FIG. 10 selects the practice mode shown in FIG. 11, pressing the selection button 15 once from the practice mode state shown in FIG. 11 returns to the normal mode, and further pressing the selection button 15 once more selects the real mode. Further, pressing the selection button 15 once more from the real mode state selects the expert mode, though not shown in the drawings. In this way, pressing the confirm/start button 13 in the state with the practice mode selected selects the practice mode, pressing the confirm/start button 13 in the state with the normal mode selected selects the normal mode, pressing the confirm/start button 13 in the state with the real mode selected selects the real mode, and pressing the confirm/start button 13 in the state with the expert-real mode selected selects the expert-real mode. In order to simplify description, the following will be described with reference the case of the normal mode. Also, the practice mode will be mentioned later as a practicing mode.

Next, stage selection processing is performed in step ST2. That is, as shown in FIG. 13, selection of the played music piece is performed such that multiple notes corresponding to the difficulty of the played music piece are displayed on the monitor 2, so pressing the selection button 14 once displays the title "I THINK ABOUT YOU" for the next played music piece to the left side of the monitor 2. Also, pressing the selection button 15 once displays the title "YOU CAN MAKE IT" for the played music piece to the left side of the monitor 2. In the state that the title of the played music piece is displayed, pressing the confirm/start button 13 finalizes the selection of the played music piece for the displayed title.

Further, data is loaded in step ST3. Control programs for instructing the procedures for the rhythm-matching game and related data, other than the background music data, are read into the main RAM 13 from the CD-ROM 45 which is the recording medium. Thus, once the preparation for playing is completed, the game screen such as shown in FIG. 7 and FIG. 8 is displayed on the monitor 2 in step ST4. The notes display 53 indicating the operation timing instruction procedures for the striking or pedal operation for each of the mimic percussion instruments as to the selected music piece is displayed on the left side of the monitor 2. A screen corresponding with the state of the music piece according to that selected music piece is displayed on the right side of the monitor 2. Further, the amount of life remaining before the game is over is displayed at the upper right side of the monitor 2, in the form of a horizontal bar graph 56.

The notes display 53 displayed on the monitor 2 has notes bars 54 indicating the operating timing of the series of rhythm sounds in a vertical array corresponding to the marks for the mimic percussion instruments sequentially coming down from above, and also the player must strike or perform pedal operation of the mimic percussion instrument corresponding to the mark at the point that the notes bar 54 reaches the reference line 55 above the mimic percussion instrument mark.

Further, the CPU 52 obtains the CD sector number that the CD is currently reproducing in step ST5, and updates the position of the notes display 53 in step ST6. The player watches the notes display 53 (the timing instruction procedures for the striking or pedal operation of the mimic percussion instruments) to the left of the monitor 2, and performs striking and/or pedal operation of the mimic percussion instruments with the left and right hands and/or right foot, along with the background music. At this time, input instruction signals are output to the CPU 52, and the CPU 52 judges whether or not there has been signal input within a certain timing in step ST7.

At the point that the player has performed striking or pedal operation in step ST7, the extent of matching (degree of matching) between the type of mimic percussion instrument to which the striking or pedal operation was performed in step ST8 and the input detection timing thereof, and the sound data in the table (the type of mimic percussion instrument for the rhythm sound in the played music piece, and the operation timing thereof) is obtained, and in step ST9, at the input detection timing to the mimic percussion instrument, the CPU 52 controls the sound processor 14 to obtain rhythm sound data corresponding to the mimic percussion instrument in the played music piece from the PCM data, and mixes that rhythm sound data with the background music data from the CD-ROM 45 and the mixing unit 46, and emits sound from the speakers 3 and 4.

Further, in step ST10, the remaining life amount (gauge amount) calculation for how much longer the game can be played, and score calculation is performed. That is, scores are extracted from the score table in step ST10 and calculated according to conditions such as the amount of offset from the reference timing range for the input detection timing of the striking or pedal operation to the mimic percussion instruments as described above (the level of degree of matching), mistakes in the type of mimic percussion instrument, cases wherein continuous striking or pedal operation is correct, cases wherein input of input instruction signals from striking or pedal operation which should have existed within a certain timing period in step ST7 but did not, and so forth; and further, the time necessary for the striking or pedal operation input is calculated.

Further, the gauge, score, and staging is updated in step ST11, based on the gauge amount calculations and score calculation results in step ST10. That is, the score calculated in step ST10 is added to the accumulated score and updated and stored in the main RAM 43. Also, in the event that the operation timing of the player on the mimic percussion instruments in step ST10 is within the time width of "Poor" or is a "Miss", the gauge amount is decreased, and in the event that the operation timing is within the time width of "Perfect" and "Great", accumulation calculation is made to increase the gauge amount, and this is displayed as the horizontal bar graph on the monitor 2 as represented by reference numeral 56 in FIG. 7 and FIG. 8.

Further, in step ST12, judgement is made whether or not playing of the selected music piece has ended by detecting the presence or absence of an ending code attached at the end of the PCM data of the selected music piece obtained by the CPU 52 via the sound processor 44, and in the event that the playing of the selected music piece has not ended, the flow returns to step ST5.

Also, in the event that step ST12 yields YES (the playing of the selected music piece has ended), judgement is made in step ST13 whether or not selected music piece has been cleared, and in the event that the selected music piece has not been cleared, a game interruption display is made on the monitor 2 in step ST14, and the game is ended. Also, in step ST13, in the event that the selected music piece has been cleared, in step ST15 a grades display screen including total scores as evaluation of the playing based on the score calculation results such as shown in FIG. 16 for example, overall evaluation (e.g., displayed by alphabet, letters A through E, etc.) and the like, on the monitor 2, thereby notifying the player of the stage results.

Further, in step ST16, judgement is made by the CPU 52 regarding whether or not a stipulated number of stages (e.g., up to three selected pieces can be selected) has been achieved, along with whether or not there is any remaining life amount updated, and in the event that the stipulated number of stages has been achieved or there is no remaining life amount the game ends, and in the event that the stipulated number of stages has not been achieved or there is yet remaining life amount, the flow returns to step ST2 and performs the series of processing for the next sound (step ST3 through ST15) and this is repeated until the stipulated number of stages has been completed or there is no life amount remaining.

Subsequently, in step ST16, in the event that the CPU 52 detects the ending code attached to the end of the PCM data of the selected music piece (the stipulated number of stages has been completed), judgement is made that the playing of the selected music piece has ended, so the CPU 52 controls the graphic controller 48 to make a game-over display on the monitor 2, to end the game.

Figure 19:
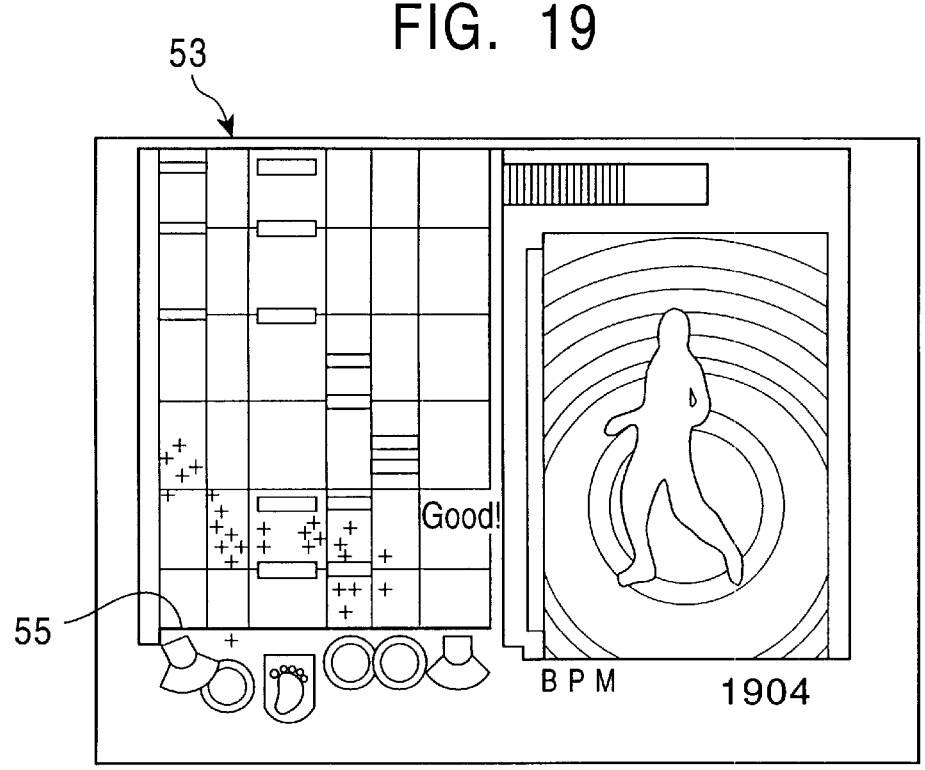
FIG. 19 is a diagram illustrating yet another example of the game screen displayed on the monitor shown in FIG. 6.
Figure 20:
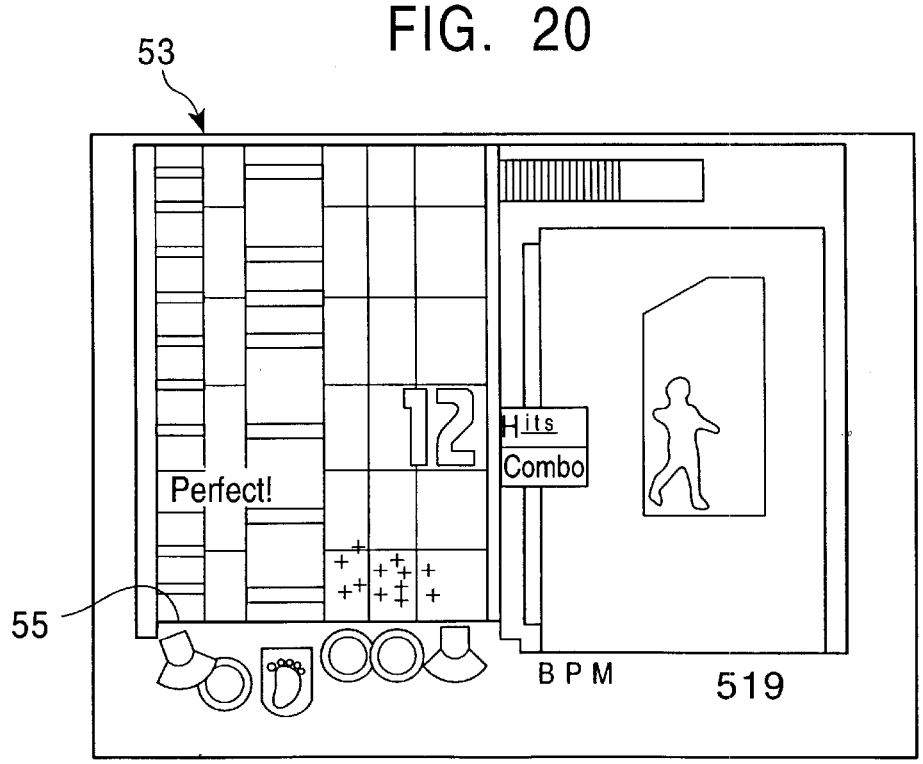
FIG. 20 is a diagram illustrating still another example of the game screen displayed on the monitor shown in FIG. 6.

Next, the operation of the practicing mode (practice mode) will be described. In the event that the practice mode is set, first, a teacher for performing a model performance appears on the monitor 2 and plays a certain practice piece, which the player listens to and learns the sense of operation timing for the striking or pedal operation. Next, a game screen such as shown in FIG. 19 and FIG. 20 for example is displayed on the screen of the monitor 2, and the operation timing for the striking or pedal operation to the mimic percussion instruments for that practice piece are displayed and instructed on the position of the notes display 53, along with which the striking or pedal operation is performed, whereby sound is emitted according to the type of mimic percussion instrument and the input detection timing. The type of mimic percussion instrument and the operation timing made by the player is judged by the evaluation of the rhythm-matching game depending on whether or not it matches the display instruction timing in the notes display 53, as with the above-described normal mode.

As described above, according to the present embodiment, the CPU 52 controls the graphic controller 48 based on the control program within the main RAM 43 to extract a series of rhythm sound data for each of the multiple mimic percussion instruments each from the graphic RAM 47 and display these in a related manner in the time-axial direction on the monitor 2, perform display instruction for operation timing regarding the sounds of the multiple mimic percussion instruments on the monitor 2, sequential striking input of rhythm sounds is performed by the player with the left and right hands for example via the rhythm input detecting means 49 corresponding to the multiple mimic percussion instruments, while confirming the operation timing display instructions, and the timing thereof is compared with the display instruction timing and evaluation is made from the offset amount, and the evaluation results are accumulated, so a rhythm-matching game with a higher gaming nature can be realized, and also, even though percussion instrument playing is performed in a state closer to reality using at least the right hand and left hand, and further the right foot, for rhythm sound input, the rhythm-matching game does not become complex, and can be carried out relatively easily.

Also, the rhythm input detecting means can be easily configured by attaching shock sensors 23 to mimic percussion instruments. Also, in the event that the shock sensors 23 detect not on/off but detect analog striking amounts, the sound data can have touch intensity, which gives a greater variety of sounds emitted by sound emission instruction, and the gaming of the rhythm-matching game can be carried out at an even higher level.

Further, drum pads 7 through 9 are used for drums, drum pads 10 and 11 for cymbals, and the foot pedal 12 for the bass drum, etc., i.e., multiple mimic percussion instruments are used, so the rhythm-matching game can be carried out using right and left hands and further the feet, in a state closer to reality.

Further, the display array of each series of rhythm sounds in the notes display 53 on the monitor 2 matches the array of the multiple mimic percussion instruments, and marks represent the mimic percussion instrument corresponding to the display area for each series of rhythm sounds, so the display array for guiding the striking or pedal operation of the multiple mimic percussion instruments along the time-system is readily viewed.

Further, the various display forms are changed at the operating timing in the notes display 53 on the monitor 2, so whether the operating timing is good or bad is clearly understood in real-time, so the player can perform the game at a high level.

Further, sound emission output control and rhythm input evaluation is performed according to the sound selection contents (type of the mimic percussion instrument) and the input detection timing thereof, so evaluation can be made accurately on an evaluation standard, so in the event that two take turns to play, the two can compete regarding the evaluation standard, and the rhythm-matching game can be enjoyed in a fair and objective manner.

Further, sound emission instruction is performed with the notes display 53 as a guide, so even a relatively complex played music piece can be easily played in the rhythm-matching game. Also, misses in input are displayed on the notes display 53 in real-time, so the player can identify and immediately correct his/her mistake in real-time, thereby allowing the rhythm-matching game to be enjoyed at an even higher level.

Incidentally, with the present embodiment, the display for instructing sound emission timing by the display control means is of a configuration wherein the notes bars 54 are sequentially displayed from the top toward the bottom on the monitor 2, as shown in the notes display 53 in FIG. 7 and FIG. 8, but configurations may be made wherein the notes bars 54 are scrolled from the bottom toward the top on the monitor 2, or from one horizontal side toward the other side, thereby making sequential display.

The present invention is not restricted to the above embodiments, and the following variations can be employed.

(1) With the present embodiment, the timing as to the sound data instructed as input detection timing, and the operation timing instruction display in the notes display 53 are compared, and the rhythm input is evaluated based on that offset amount, but the evaluation means may evaluate based on the total offset amount obtained by accumulating the offset amount for each piece of sound data, or an arrangement may be made wherein the evaluating means sets a tolerance range before and after the operation timing of each piece of sound data, and calculates score by accumulating subtraction values set according to the smallness of the amount of being off within the inner side of the boundary of the tolerance range as a reference thereof, and addition values set according to the greatness of the amount of being off at the outer side thereof.

(2) According to the present embodiment, in the notes display 53, the notes bars 54 of rhythm sounds sequentially move downwards along with elapsing of time toward the reference line 55, with the point of matching the reference line 55 being the timing for striking or pedal operating, and here, the notes bars 54 move, but the invention is not restricted to this, so the reference line 55 may move, or the reference line 55 and the notes bars 54 may move, with the overlapping point being the input instructing timing.

(3) With the present embodiment, the arrangement is such that one or multiple pieces can be selected from five pieces for four stages of play levels, highest level (expert-real), advanced (real), medium (normal), and beginner (practice), but an arrangement may be made wherein multiple pieces (e.g., three) other than the five are hidden, and at the point that the selection of pieces remaining is close to being depleted, the hidden three pieces then appear on the monitor 2, so as to be selectable. This reduces the unfairness for individuals selecting pieces at the point that the selection of pieces remaining is close to being depleted, and the rhythm-matching game can be enjoyed more.

(4) With the present embodiment, a description has been made of drums, bass drums, and further cymbals as input means mimicking percussion instruments, but the invention is not restricted to this, and can be applied to other percussion instruments such as xylophones, glockenspiels, kettledrums, other percussion instruments, and so forth.

(5) With the present embodiment, the sound output control means is configured so as to output the sound data instructed as the operating timing to the sound emitting means and be emitted, but the invention is not restricted to this, and the sound emitting means may be controlled so as to conduct sound output only of background music, without outputting sound data instructed as operating timing to the sound emitting means, with evaluation of the input being displayed and output in the same manner as with the above embodiment.

(6) With the present embodiment, the foot pedal 12 has been provided as the rhythm input detecting means for the bass drum, to be operated with the right foot; in addition, or independently instead of this, a high-hat pedal (for emitting short or long cymbal sounds) for operation with the left foot may be provided. In this case, performing operation instruction for simultaneous operation of the high-hat pedal and the drum pad 10 equivalent to a cymbal is even more effective.

(7) With the present embodiment, percussion instruments such as drum pads 7 through 9 mimicking drums with differing tones and drum pads 10 and 11 mimicking cymbals with differing tones have been provided, but the present invention is not restricted to such; rather, the drum pads 7 through 11 may be correlated to drum sounds of all different tone and/or the same tone drum sound, or, drum pads 7 through 11 may be other instruments, particularly percussion instruments (e.g., kettledrums or other percussion), or even piano sounds, and further may even be sounds of people, animal sounds or other sounds (such as sea waves roaring). Further, the arrangement may be such wherein the tone changes while playing.

(8) With the present embodiment, the staging operating means are configured of drum pads 7 through 11 for mimic percussion instruments and shock sensors 23 attached to each, with these being arrayed at the front of the housing, but the present invention is not restricted to such; rather, the position of the mimic percussion instruments may be at the front of the housing and arrayed around a position facing the front thereof. Any arrangement is permissible so long as the multiple types of drum pads are arrayed within reach of the player and centered in front of the housing.

(9) With the present embodiment, an example has been described of a rhythm game apparatus staging various displays with a monitor 2 other than the rhythm sound of the percussion instruments and using lamp effects, as staging put on to the music along with matching rhythm sounds of percussion instruments such as a drum set, but the present invention is not restricted to such; any arrangement is permissible so long as it is a music staging game apparatus which performs playing regarding music. Various kinds of staging for the music can be conceived, other than the rhythm sound of the percussion instruments and various displays on the monitor 2, and further lamp effects.

As described above, according to a first aspect of the present invention, a music staging game apparatus comprises: a plurality of staging operating means positioned in front of the housing and facing around a position at the front thereof for staging input from a player by at least a striking operation; a storage means for storing data regarding music and staging means for the music; a playing means for playing the music based on the storage contents of the storage means; a staging operation instructing means for visually instructing the player in the staging operating using the staging operating means, following the storage contents of the storage means in a manner synchronous with the progression of the playing by the playing means; a staging effects generating means for generating staging effects corresponding to the staging operation; and an evaluating means for evaluating the staging operation based on the correlation between the staging procedures stored by the storage means and the staging operation made by the player. Also, the staging operation instructing means may have a display means, and a display control means for displaying on the display means the staging of a plurality of types as to music in a manner respectively related in the time axial direction, and for visually performing operation timing instruction for a plurality of types of staging for the music; and the evaluating means may have judging means for judging whether or not the staging as to the music subjected to staging input from the staging operating means has been instructed as operating timing within a certain time interval, and a staging input evaluating means for comparing the operation timing of the staging operation instructing means as to the staging of the music instructed as the operation timing with the operation timing instruction by the display control means, thereby evaluating the staging input from this offset amount.

According to the above configuration, the staging operation using multiple staging operating means for staging input by the player comprised of at least a striking operation is visually displayed and instructed to the player following the stored contents of the storage means, and sequential striking input is performed with the left and right hands for example for staging of music corresponding to multiple staging operating means, while confirming the operation timing display instructions of the striking operation at least, so a music staging game with higher gaming nature is realized, and also, even though staging operation for music is performed in a percussion instrument playing state closer to reality using at least the right hand and left hand, and further the foot, operating for the music staging is performed based on visual display instructions, so the complexity of the music staging game is lightened, and can be carried out relatively easily.

Also, a sound generating means may be provided as the playing means, a sound output control means may be provided as the staging effects generating means, and the staging as to the music is comprised of a series of rhythm sounds; and the staging operating means may consist of a plurality of mimic percussion instruments provided each correlating to the plurality of series of rhythm sounds, and a rhythm input detecting means for receiving the striking operating to the mimic percussion instruments and detecting the operation timing of the corresponding rhythm sound. Specifically, the rhythm game apparatus according to the present invention may comprise: a rhythm sound storing means for dividing the rhythm sound of a played musical piece, comprised including at least rhythm, sound, at certain intervals in the time direction thereof, and also for storing multiple series of rhythm sounds structured as at least a series of rhythm sounds on the same time axis, as sound data one sound at a time; a display means; a display control means for displaying on the display means multiple series of rhythm sounds correlated in the time axial direction, and also for instructing the operating timing for each sound; multiple mimic percussion instruments provided so as to correspond with multiple series of rhythm sounds; rhythm input detecting means for receiving a striking operation to the mimic percussion instruments and detecting this as the operating timing of the corresponding series of rhythm sounds; a judging means for judging whether or not the sound data detected by the rhythm input detecting means is instructed as operating timing within the certain interval; a sound emitting means; a sound output control means for outputting at least background sound to the sound emitting means; and an evaluating means for comparing the operating timing of the rhythm input means as to the sound data instructed as the operating timing and the operating timing display instruction, and for evaluating the rhythm input operation from the offset amount thereof.

Also, according to a second aspect of the present invention, the method thereof comprises: a step for dividing the rhythm sound regarding a played music piece, configured containing at least rhythm sound, in certain intervals in the time direction, and for displaying on a display means a plurality of series of rhythm sounds, each configured as a series of rhythm sounds on the same time-axis, and for performing display instruction of the operating timing for each sound; a step for controlling the sound generating means to output at least background sound; a step wherein one piece of sound data is selectively instructed for a type of the mimic percussion instruments provided correlating to each of the plurality of series of rhythm sounds and an operating timing thereof, and judging is made whether or not the instructed sound data is instructed as operating timing within the certain interval; and a step for comparing the operating timing as to the instructed sound data with display instruction timing of the operation timing, and for evaluating the rhythm input from the offset amount thereof.

Also, a third aspect of the present invention comprises a computer-readable storage medium wherein are recorded control programs for executing the following steps: a step for dividing the rhythm sound regarding a played music piece, configured containing at least rhythm sound, in certain intervals in the time direction, and for displaying on a display means a plurality of series of rhythm sounds, each comprised as a series of rhythm sounds on the same time-axis, and also for performing display instruction of the operating timing for each sound; a step for controlling the sound generating means to output at least background sound; a step for controlling sound generating means and outputting at least background sound; a step wherein one of sound data is selectively instructed for a type of the mimic percussion instruments provided correlating to each of the plurality of series of rhythm sounds and an operating timing thereof, and judging is made whether or not the instructed sound data is instructed as operating timing within the certain interval; and a step for comparing the operating timing as to the instructed sound data with display instruction timing of the operation timing, and for evaluating the rhythm input from the offset amount thereof.

According to these configurations, a plurality of series of rhythm sounds are correlated respectively in the time-axial direction and displayed, and display instruction is performed for the operating timing for each sound of multiple mimic percussion instruments; and sequential striking input is performed with at least the left and right hands for example for rhythm sounds via rhythm input detecting means corresponding to multiple mimic percussion instruments, while confirming the operation timing display instructions thereof, so a rhythm-matching game with higher gaming nature is realized, and also, even though staging operation for music is performed in a percussion instrument playing state closer to reality using at least the right hand and left hand for example and further the foot, the rhythm-matching game does not become complex, and the game can be carried out relatively easily. Also, input evaluation can be performed for players making input by listening to the background music only.

Also, the rhythm input detecting means may have an acoustic sensor provided at a portion other than the striking portion of the mimic percussion instruments. According to the above configuration, the rhythm input detecting means can be easily configured using an acoustic sensor.

Also, the plurality of the mimic percussion instruments may consist of a plurality of first mimic percussion instruments mimicking a drum to beat with a stick, and at least one second mimic percussion instrument for striking input by the foot. According to the above configuration, a rhythm-matching game can be performed is a state closer to reality, using the right and left hands and further the foot.

Further, the display array of each series of rhythm sounds displayed by the display control means on the display means may match the array of the plurality of mimic percussion instruments.

Further, the display control means may display marks representing mimic percussion instruments corresponding to the display area of the respective series of rhythm sounds, within the display screen.

According to these configurations, the display array for guiding the striking or pedal operation of the multiple mimic percussion instruments along the time-system is readily viewed.

Further, the display control means changes the display format at the operating timing. According to the above configuration, whether the operating timing is good or bad is clearly understood in real-time, so the player can perform the game at a high level.

Further, the sound output control means may output to the sound generating means the sound data instructed at the point that input detection has been made with the rhythm input detecting means in a state that the judging means has affirmed, at the operating timing, and thus emits sound. Also, the sound output control means may output to the sound generating means sound data instructed as the operating timing in a state that the judging means has affirmed, at a predetermined point in time, thereby emitting sound.

Further, the evaluating means may evaluate by accumulating the evaluation value for the offset amount of each piece of sound data. Also, the evaluating means may set a tolerance range before and after the operating timing for each sound data, and calculate score by accumulating addition values set according to the smallness of the amount of being off within the inner and outer sides of the boundary of the tolerance range as a reference thereof, and subtraction values set according to the greatness of the amount of being off at the outer side thereof. Though this arrangement is such wherein the higher the score is, the higher the skill is deemed to be, but an arrangement may be made wherein the higher the score is, the lower the skill is deemed to be.

According to these configurations, sound emission output control and rhythm input evaluation is performed according to the sound selection contents (type of the mimic percussion instrument) and the input detection timing thereof, so evaluation can be made accurately on an evaluation standard, so in the event that two take turns to play, the two can compete regarding the evaluation standard, and the rhythm-matching game can be enjoyed in a fair and objective manner.

Further, the sound data may contain touch sounds. In the event that the acoustic sensors serving as the rhythm input detecting means do not detect on/off in a digital manner but detect striking amounts in an analog manner, the sound data can have touch intensity.

The above configuration gives a greater variety of sounds emitted by sound emission instruction, and the gaming of the rhythm-matching game can be carried out at an even higher level.

Further, the display control means may comprise graphic storing means for storing notes screen data for visually guiding the rhythm input operation by the operating means; and graphic control means for sequentially updating the notes screen data according to the flow of the time-system of the played music piece, and also for displaying whether or not there has been a miss in the operating timing by the rhythm input means.

According to the above configuration, sound emission instruction is performed with the notes screen as a guide, so even a relatively complex played music piece can be easily played in the rhythm-matching game. Also, misses in input are displayed on the notes screen in real-time, so the player can identify and immediately correct his/her mistake in real-time, thereby allowing the rhythm-matching game to be enjoyed at an even higher level.

Thus, the staging operation using multiple staging operating means for staging input by the player comprised of at least a striking operation may be visually displayed and instructed to the player following the stored contents of the storage means, and sequential striking input may be performed with the left and right hands for example for staging of music corresponding to multiple staging operating means, while confirming the operation timing display instructions of the striking operation at least, so as to realize a music staging game with higher gaming nature, and also, even though staging operation for music may be performed in a percussion instrument playing state closer to reality using at least the right hand and left hand, and further the foot, operating for the music staging is performed based on visual display instructions, so the complexity of the music staging game is lightened, and can be carried out relatively easily.

Also, according to multiple aspects of the present invention, rhythm sounds are each correlated in the time-axial direction and displayed, instruction and display of the operating timing for each sound of the multiple mimic percussion instruments is performed, and sequential striking input is performed with the left and right hands for example for the rhythm sounds via the rhythm input detecting means corresponding to multiple mimic percussion instruments, while confirming the operation timing display instructions thereof, so a rhythm-matching game with higher gaming nature is realized, and even though rhythm sound input is performed in a percussion instrument playing state closer to reality using at least the right hand and left hand, and further the foot, the complexity of the rhythm-matching game is lightened, and can be carried out relatively easily.

Further, the rhythm input detection means can be easily configured from an acoustic sensor, and a rhythm-matching game can be performed in a percussion instrument playing state closer to reality using at least the right hand and left hand, and further the foot, using multiple percussion instruments.

The display array of each series of rhythm sounds may be arranged to match the array of the plurality of mimic percussion instruments, with marks representing the mimic percussion instruments corresponding to the display area of the respective series of rhythm sounds, so the display array for guiding the striking or pedal operation of the mimic percussion instruments along the time-system is readily viewed.

Further, the various display forms may be changed at the operating timing, so that whether the operating timing is good or bad is clearly understood in real-time, and thus the player can perform the game at a high level.

Further, sound output control and rhythm input evaluation may be performed according to the sound selection contents (type of the mimic percussion instrument) and the input detection timing thereof, so evaluation can be made accurately on an evaluation standard, and this arrangement is particularly advantageous in the event that two take turns to play, since the two can compete regarding the evaluation standard, and the rhythm-matching game can be enjoyed in a more fair and objective manner.

Also, a great variety of sounds may be emitted by sound emission instruction, so the gaming of the rhythm-matching game can be carried out at an even higher level.

Further, sound emission instruction may be performed with the notes display as a guide, so even a relatively complex played music piece can be easily played in the rhythm-matching game. Also, misses in input may be displayed on the notes display in real-time, so the player can identify and immediately correct his/her mistake in real-time, thereby allowing the rhythm-matching game to be enjoyed at an even higher level.

What is claimed is:

1. A music staging game apparatus, comprising:

a monitor;

staging operating means for accepting staging operations input from a player on at least a first simulated musical instrument and a second simulated musical instrument, wherein said staging operations include at least a striking operation, and generating a signal indicating input times of said staging operations;

a storage means for storing music data for playing music and staging procedures data for instructing the player to perform said staging operations coordinated with said music, said staging operations including playing said first simulated musical instrument and said second simulated musical instrument;

a playing means for playing said music using the music data in said storage means;

a staging operation instructing means for visually instructing said player to perform said staging operations using said staging operating means based on said staging procedures data of said storage means in a manner synchronous with said music by displaying signal marks moving and a reference mark on said monitor to indicate operation timings, which are times to perform the staging operations, by the signal marks arriving at the reference mark, said signal marks including a first signal mark corresponding to said first simulated musical instrument and a second signal mark corresponding to said second stimulated musical instrument which are simultaneously displayed on said monitor approaching the reference mark;

a staging effects generating means for generating staging effects corresponding to said staging operations;

an evaluating means for evaluating said staging operations based on correlation between the staging procedures stored by said storage means and said staging operations input by said player; and evaluation display means for displaying to said player evaluation results of said evaluating means and for temporarily replacing said signal marks with alternative characters contemporaneously with said input of said staging operations at offsets corresponding to ones of said alternative characters to provide a real time indication of the evaluating of the staging operations.

2. A music staging game apparatus according to claim 1, wherein:

said staging operation instructing means has a display means, and a display control means for displaying said signal marks moving in a time axial direction for visually indicating the times to perform for a plurality of types of said staging operations; and said evaluating means has judging means for judging whether said staging operations are input from said staging operating means at said input times within a certain time interval about said times to perform, and basing said evaluation results on offset amounts between said input times when said staging operations are input and said times to perform.

3. A music staging game apparatus according to claim 2, wherein said display control means changes a display format at said times to perform.

4. A music staging game apparatus according to claim 1, wherein:

a sound generating means is provided as said playing means, a sound output control means is provided as said staging effects generating means and produces a series of rhythm sounds as said staging effects; and said first and second simulated musical instruments include a plurality of mimic percussion instruments correlating to said series of rhythm sounds, and a rhythm input detecting means for detecting the input times of the rhythm sounds.

5. A music staging game apparatus according to claim 4, wherein said rhythm input detecting means has an acoustic sensor provided at a portion other than a striking portion of said mimic percussion instruments.

6. A music staging game apparatus according to claim 4, wherein said plurality of said mimic percussion instruments includes a plurality of first mimic percussion instruments mimicking drums played with a drumstick, and at least one second mimic percussion instrument for mimicking a percusion instrument played using a foot operated device.

7. A music staging game apparatus according to claim 4, wherein the times to perform the series of rhythm sounds are indicated by said signal marks having differing appearances from each other which correspond to ones of the plurality of mimic percussion instruments and moving along paths which correspond in arrangement to an arrangement of the plurality of mimic percussion instruments.

8. A music staging game apparatus according to claim 4, wherein said display control means displays said signal marks moving along paths with identifying marks having differing appearances from each other which correspond to ones of the plurality of mimic percussion instruments to which said signal marks apply.

9. A music staging game apparatus according to claim 4, wherein:

said evaluating means has judging means for judging whether said staging operations are input from said staging operating means at said input times within a certain time interval about said times to perform, and basing said evaluation results on offset amounts between said input times when said staging operations are input and said times to perform; and said sound output control means outputs to said sound generating means sound data when the input times detected with said rhythm input detecting means are affirmed by said judging means as being within said certain time interval.

10. A music staging game apparatus according to claim 4, wherein:

said evaluating means has judging means for judging whether said staging operations are input from said staging operating means at said input times within a certain time interval about said times to perform, and basing said evaluation results on offset amounts between said input times when said staging operations are input and said times to perform; and said sound output control means outputs to said sound generating means sound data of said music when said judging means has affirmed said input times are within said certain time interval, and sound data of a warning sound other than of said music when said staging operations are not performed within said certain time interval.

11. A music staging game apparatus according to claim 4, wherein said music data contains touch sounds.

12. A music staging game apparatus according to claim 4, wherein said display control means comprises:

graphic storing means for storing notes screen data for displaying said signal marks to indicate said tomes to perform; and graphic control means for sequentially updating said notes screen data according to flow of time of the played music, and also for displaying whether or not there are misses defined by staging operations not being performed within a given time range of corresponding ones of the times for input.

13. A music staging game apparatus according to claim 1, wherein:

said evaluating means has judging means for judging whether said input times at which said staging operations are input from said staging operating means are within a certain time interval about said times to perform, and basing said evaluation results on offset amounts between said input times when said staging operations are input and said times to perform such that said offsets are determined to correspond to one of a plurality of evaluation levels ranging from superiority to inferiority when the input times are within the certain time interval;

said evaluating means evaluates by accumulating an evaluation value for each of said offset amounts;

graphic storing means for storing notes screen data for displaying said signal marks to indicate said times to perform and displaying alternative characters corresponding to said plurality of evaluation levels; and graphic control means for sequentially updating said notes screen data according to flow of time of the played music, and for temporarily replacing said signal marks with ones of said alternative characters contemporaneously with said input of said staging operations at offsets corresponding to ones of said plurality of evaluation levels of said alternative characters to provide a real time indication of the evaluating of the staging operations.

14. The game apparatus of claim 13 wherein when said offsets are determined to correspond to ones of said plurality of evaluation levels corresponding to a superior range of said ranging from superiority to inferiority, a congratulatory symbol is displayed in addition to said temporarily displayed alternative characters.

15. A music staging game apparatus according to claim 1, wherein said evaluating means sets a tolerance range extending before and after the time to perform, and calculates score by accumulating addition values set according to proximity of the input times to the times for input for ones of the input times within the tolerance range, and by accumulating subtraction values set according to amounts other ones of the input times are outside of the tolerance range.

16. The game apparatus of claim 1 wherein said signal marks are disposed on a vertical time axis which moves to advance said signal marks to said reference mark.

17. The game apparatus of claim 1 wherein said first and second signal marks are arrayed vertically to indicate timing thereof.

18. The game apparatus of claim 17 wherein said signals marks are arrayed vertically on a plurality of vertical time axes, each respectively corresponding to one of said at least said first simulated musical instrument and said second simulated musical instrument, and said signal marks move vertically to the reference mark.

19. The game apparatus of claim 17 wherein said signals marks move vertically to pass through the reference mark.

20. The game apparatus of claim 1 wherein said signal marks and said reference mark are displayed on said monitor on a first portion of said monitor and a pictorial scene corresponding to said music is simultaneously displayed on a second portion of said monitor.

21. A music staging game method, comprising the steps of:

displaying a plurality of series of signal marks on timing axes moving toward a stationary reference mark through which said signal marks move to indicate operation timings for a player to conduct staging operations by the signal marks arriving at the reference mark, the staging operations being played on corresponding ones of a plurality of percussion instrument input devices;

accepting staging operations input from the player and determining input times of said staging operations;

evaluating said staging operations by determining whether the input times fall within timing intervals disposed about said operation timings and, if said input times fall within said timing intervals, determining offset amounts of said input times from said staging operations such that said offsets are determined to correspond to one of a plurality of evaluation levels ranging from superiority to inferiority when the input times are within the certain time intervals; and temporarily replacing said signal marks with alternative characters corresponding to ones of said plurality of evaluation levels contemporaneously with said accepting of said staging operations to provide a real time indication of the evaluating of the staging operations.

22. The music staging game method of claim 21, further comprising the step of outputting sounds corresponding to respective ones of said plurality of percussion instrument input devices when said input times are within said timing intervals and outputting warning sounds when said input times are outside said timing intervals.

23. A readable storage medium having stored thereon an executable code for a music staging program for performing the steps of:

displaying a plurality of series of signal marks on timing axes moving toward a stationary reference mark through which said signal marks move to indicate operation timings for a player to conduct staging operations by the signal marks arriving at the reference mark, the staging operations being played on corresponding ones of a plurality of percussion instrument input devices;

accepting staging operations input from the player and determining input times of said staging operations;

evaluating said staging operations by determining whether the input times fall within timing intervals disposed about said operation timings and, if said input times fall within said timing intervals, determining offset amounts of said input times from said staging operations such that said offsets are determined to correspond to one of a plurality of evaluation levels ranging from superiority to inferiority when the input times are within the certain time intervals; and temporarily replacing said signal marks with alternative characters corresponding to ones of said plurality of evaluation levels contemporaneously with said accepting of said staging operations to provide a real time indication of the evaluating of the staging operations.

24. The readable storage medium of claim 23, wherein the program further comprises the step of outputting sounds corresponding to respective ones of said plurality of percussion instrument input devices when said input times are within said timing intervals and outputting warning sounds when said input times are outside said timing intervals.

25. A game apparatus, comprising:

a plurality of input devices to be operated by a player;

a memory storing tuning data indicating timings for operating said input devices;

a display device having a display screen;

a controller for driving said display device based on said timing data to display on said display screen moving marks, which move in columns which correspond to respective ones of said plurality of input devices, and a reference mark to which said moving marks move to indicate said timings for operating said input devices when the moving marks arrive at the reference mark;

a sound output device;

said memory further including sound data for respective ones of said plurality of input devices;

said controller sending corresponding ones of said sound data to said sound output device to produce a sound associated with a respective one of said plurality of input devices only when said respective one of said plurality of input devices is operated by the player within a predetermined time interval about an indicated timing for said respective one of said plurality of input devices; and said controller temporarily replacing said moving marks with alternative characters contemporaneously with said operation of said plurality of input at timing offsets corresponding to ones of said alternative characters to provide a real time indication of timing of the operation.

26. The game apparatus according to claim 25, wherein said controller evaluates operation of said input devices based on timings of operations of said input device being within a set of predetermined time ranges of indicated timings for said input devices.

27. The game apparatus according to claim 26, wherein said moving marks move downward.

* * * * *